(12) United States Patent
Yang

(10) Patent No.: US 6,297,575 B1
(45) Date of Patent: *Oct. 2, 2001

(54) COMBINED POWER DRIVEN DEVICE HAVING A THREE-LAYERED ELECTROMECHANICAL STRUCTURE WITH COMMON STRUCTURES

(76) Inventor: Tai-Her Yang, No. 32 Lane 29, Taipin St., Si-Hu Town, Dzan-Hwa (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,600

(22) Filed: Mar. 3, 1998

(51) Int. Cl.$^7$ .............................. H02K 1/22; H02K 7/10; H02K 7/20; H02K 47/04; H02K 16/00

(52) U.S. Cl. ................ 310/266; 310/96; 310/100; 310/112; 310/113; 310/116; 310/118; 290/6

(58) Field of Search .................. 310/266, 102 R, 310/113, 102 A, 92, 112, 114, 115, 75 R, 76, 77, 78, 118, 96, 100; 290/6

(56) References Cited

U.S. PATENT DOCUMENTS

| | | | |
|---|---|---|---|
| 925,504 | * 6/1909 | Porsche | 310/102 R |
| 993,611 | * 5/1911 | Midgley et al. | 192/48.2 |
| 1,521,301 | * 12/1924 | Jones | 310/266 |
| 1,836,298 | * 12/1931 | Winther | 475/152 |
| 1,848,091 | * 3/1932 | Winther | 310/102 R |
| 2,064,583 | * 12/1936 | Wolkoff | 310/113 |
| 2,223,210 | * 11/1940 | Hefel | 310/102 R |
| 2,411,122 | * 11/1946 | Winther | 310/266 |
| 2,465,006 | * 3/1949 | Bowes et al. | 310/102 R |
| 2,832,908 | * 4/1958 | Abbott | 310/266 |
| 2,837,670 | * 6/1958 | Thomas et al. | 310/266 |
| 2,864,016 | * 12/1958 | Waltcheff | 310/102 R |
| 3,383,532 | * 5/1968 | Zeisler et al. | 310/102 R |
| 3,619,676 | * 11/1971 | Kawakami et al. | 310/112 |
| 3,683,249 | * 8/1972 | Shibata | 318/205 |
| 3,845,338 | * 10/1974 | Fawzy | 310/154 |
| 4,110,645 | * 8/1978 | Hendershot, Jr. | 310/154 |
| 4,259,604 | * 3/1981 | Aoki | 310/113 |
| 4,375,047 | * 2/1983 | Nelson et al. | 318/48 |
| 4,644,206 | * 2/1987 | Smith | 310/115 |
| 5,103,127 | * 4/1992 | Peter | 310/113 |
| 5,107,156 | * 4/1992 | Jaun et al. | 310/162 |
| 5,311,092 | * 5/1994 | Fisher | 310/266 |
| 5,519,275 | * 5/1996 | Scott et al. | 310/112 |
| 5,675,203 | * 10/1997 | Schulze et al. | 310/113 |
| 5,708,314 | * 1/1998 | Law | 310/114 |
| 5,723,928 | * 3/1998 | Imai et al. | 310/114 |
| 5,744,895 | * 4/1998 | Seguchi et al. | 310/266 |
| 5,751,086 | * 5/1998 | Taghezout | 310/112 |
| 5,793,136 | * 8/1998 | Redzic | 310/114 |
| 5,828,136 | * 10/1998 | Yang | 290/4 A |

* cited by examiner

Primary Examiner—Elvin Enad
Assistant Examiner—Dang Dinh Le
(74) Attorney, Agent, or Firm—Bacon & Thomas, PLLC

(57) ABSTRACT

A combined power driven device is made up of three layers, each of the three layers forming an electromechanical structure such as a stator or an armature. One of the three layers serves as a common magnetic structure for interaction with the electromechanical structures formed by the other two layers and the three layers may be mechanically coupled with each other, a load, and/or an active power source to provide either generator or motor functions, or a combination of generator and motor functions.

14 Claims, 19 Drawing Sheets

COMBINED POWER DRIVEN DEVICE HAVING A THREE-LAYERED ELECTROMECHANICAL STRUCTURE WITH COMMON STRUCTURES

SUMMARY OF THE INVENTION

The combined power driven device having a three-layered electromechanical structure with common structures is an innovative design which originally combines the electromechanical effect actuators used for constituting the generators or motors for generation or motor functions in the conventional combined power system with the field or the armature into a common structure type in order to save cost, weight and space requirements.

BRIEF DESCRIPTION OF THE DRAWINGS

FIG. 24-1 is a schematic diagram of the embodying example illustrating that the embodying example of FIG. 24 provides output directly through the planetary wheel with a fixed center of axis.

FIG. 25-1 is a schematic diagram of the embodying example illustrating that the embodying example of FIG. 25 provides output directly through the planetary wheel with a fixed center of axis.

FIG. 26-1 is a schematic diagram of the embodying example illustrating that the embodying example of FIG. 26 provides output directly through the planetary wheel with a fixed center of axis.

FIG. 27-1 is a schematic diagram of the embodying example illustrating that the embodying example of FIG. 27 is modified to let the middle layer common structure be a free rotor.

FIG. 28-1 is a schematic diagram of the embodying example illustrating that the embodying example of FIG. 28 provides output directly through the planetary wheel with a fixed center of axis.

FIG. 29-1 is a schematic diagram of the embodying example illustrating that the embodying example of FIG. 29 provides output directly through the planetary wheel with a fixed center of axis.

FIG. 30-1 is a schematic diagram of the embodying example illustrating that the embodying example of FIG. 30 provides output directly through the planetary wheel with a fixed center of axis.

FIG. 31-1 is a schematic diagram of the embodying example illustrating that the embodying example of FIG. 31 is modified to let the middle layer common structure be a free rotor.

FIG. 32-1 is a schematic diagram of the embodying example illustrating that the embodying example of FIG. 32 provides output directly through the planetary wheel with a fixed center of axis.

FIG. 33-1 is a schematic diagram of the embodying example illustrating that the embodying example of FIG. 33 provides output directly through the planetary wheel with a fixed center of axis.

FIG. 34-1 is a schematic diagram of the embodying example illustrating that the embodying example of FIG. 34 provides output directly through the planetary wheel with a fixed center of axis.

FIG. 35-1 is a schematic diagram of the embodying example illustrating that the embodying example of FIG. 35 is modified to let the middle layer common structure be a free rotor.

FIG. 36-1 is a schematic diagram of the embodying example illustrating that the embodying example of FIG. 36 provides output directly through the planetary wheel with a fixed center of axis.

FIG. 37-1 is a schematic diagram of the embodying example illustrating that the embodying example of FIG. 37 provides output directly through the planetary wheel with a fixed center of axis.

FIG. 38-1 is a schematic diagram of the embodying example illustrating that the embodying example of FIG. 38 provides output directly through the planetary wheel with a fixed center of axis.

FIG. 39-1 is a schematic diagram of the embodying example illustrating that the embodying example of FIG. 39 is modified to let the middle layer common structure be a free rotor.

DETAILED DESCRIPTION OF THE INVENTION

Figure 1:
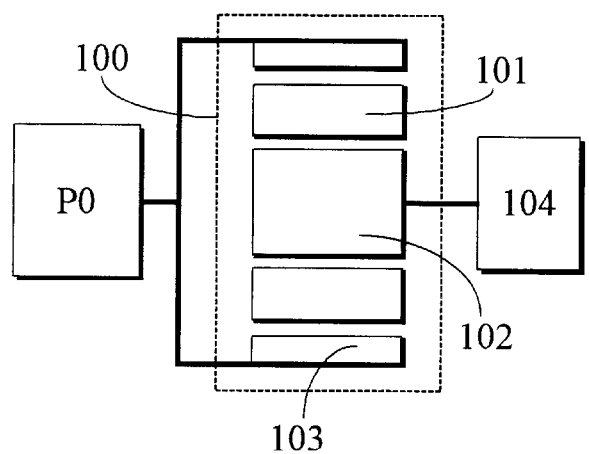
FIG. 1 is the basic embodying schematic diagram of the invention.

The combined power driven device having a three-layered electromechanical structure with common structures is comprised of that magnetic poles or armatures of the two or more than two electromechanical structures are combined to have a middle layer common structure and two independently interactive coaxial electromechanical effect actuators, whereby the electromagnetic actuation between the two electromechanical actuators and the common structure provides the generation or motor functions, wherein the two electromechanical effect actuators can be independently operated or operated simultaneously with same functions or different functions, whereof its constitution is mainly characterized in the following:

A three-layered electromechanical structure is interacted at the same axis, wherein its middle layer common structure can be a common magnetic pole for respectively matching with two independent armatures, wherein the common structure type include that the two poles of the same magnetic pole are respectively coupled with two independent armatures, or independent magnetic poles for matching with different armatures are respectively installed on the common structure of the same magnetic conductor to couple with the two armatures, wherein the common structured poles and the armature can be exchanged to be the embodying type of that the two armatures are back to back common structured to respectively coupled with two independent magnetic poles, or the common structure is commonly structured by the armature and the field to respectively couple with corresponding individual armature and field;

A three-layered electromechanical structure with a common structure, wherein it is characterized in that one layer of the structure is locking fixed with the casing static structure, while the other two layers are respectively coupled with the load and the active power source P0 (such as engine or other mechanical or manpower) to be driven by the active power source P0 to provide generation function, thereof the power is provided for direct generation output or for charging the batteries or other power storage devices and for latter output, or the generator and the battery power provide output together to drive the three-layered electromechanical structure, while the other armature provides motor function to drive the load for positive or reverse rotation.

Besides, the three-layered electromechanical structure with a common structure can be further installed with an unidirectional transmission device, or further installed with a clutch, or further installed with a differential wheel train between each corresponding rotors of the three-layered electromechanical structure with a common structure to constitute interactive relationships and to further characterized in that the active power source P0 and the three-layered electromechanical structure employed for motor function can be used to provide speed and power addition combined output or can be coupled for differential speed reduction.

The basic structure and interactive features of the combined power driven device having a three-layered electromechanical structure with common structures are as following:

FIG. 1 is the basic embodying schematic diagram of the combined power driven device having a three-layered electromechanical structure with common structures, wherein the active power source P0 is coupled with the outer layer armature of the three-layered electromechanical common structure, and a middle layer common magnetic pole is provided and the inner layer armature is coupled with the output shaft; whereof it is mainly comprised of the following:

A three-layered electromechanical common structure 100: It is ring installed in three layers at the same axis, whereof the middle layer is a common magnetic structure 101, the inner layer is armature 102 and the outer layer is armature 103, whereby the three constitutes a closed magnetic circuit, wherein besides of that all three layers can be freely rotated, the interactive relationships between the three layers can be modified as following according to the application requirements:

One of the three layers is directly locking fixed with the casing static structure or controlled by an unidirectional transmission device, or a clutch, or a brake. Besides of electromagnetic actuation between the three layers or two of the three layers, it can also be controlled by an unidirectional transmission device or a clutch to do rotational energy transmission;

The inner layer armature 102 and the outer layer armature 103 is controlled by the corresponding electromechanical actuation property of the driving control device to do positive/reverse rotation and speed change to drive the load 104 or is driven by the active power source P0 or the external mechanical energy input to operate as a generator to provide power generation output, while its charging current to the battery is controlled by the corresponding electromechanical actuation property of the adjusting control device; wherein the inner layer armature 102 and the outer layer armature 103 can also accept the power input to function as a motor, thereof the above motors and generator functions can be either operated independently or simultaneously.

The electromechanical actuation property of the three-layered electromechanical structure of the combined power driven device having a three-layered electromechanical structure with common structures are composed of the same or different electromechanical actuation types including the AC or DC, brush or brushless, synchronized or synchronized types of the generator or motor functions or the electromechanical structure which can be operated as a generator or a motor, , wherein the electromechanical structure is comprised of the cylindrical, ring shape, cone shape, disk shape, or cup shape structures and can be selectively installed according to the embodying types with electrical machine interface structures such as commutators or conducting rings and conducting brushes; wherein the magnetic pole can be the electromagnetic power unit of the three-layered electromechanical structure with a common structure constituted by a permanent magnet type or a winding excitation type, or a magnetic resistance type magnetic pole, thereof for the disclosed three-layered electromechanical structure with a common structure, the common magnetic pole of the common structure constituted by magnetic conductors and its coupled individually independent coaxial armature structures can also be exchangeable type, i.e. to have a common armature and its coupled individually independent field, or to have a common structure comprised of the independent magnetic poles and the armature and the said structure is respectively coaxially coupled with the individually independent fields and to have the same electromagnetic effects of the corresponding generator or motor functions.

The combined power driven device having a three-layered electromechanical structure with common structures by employing the power unit of the three-layered common electromechanical structure for the basic embodiment as in FIG. 1 can be combined with the following electrical machine auxiliary interfaces, as well as to select the matching mechanical transmission auxiliary interface, structure auxiliary interface to match with the various required applications, wherein the auxiliary interfaces include the following:

(A) Electrical machine auxiliary interface: It includes the various commutators, conducting rings, conducting brushes, and brush seats in cylindrical or side disk shapes, or it can be further selectively installed with speed Detector devices, angular translation detector devices, wherein its embodying types include the following:

If each corresponding rotor of the three-layered electromechanical structure 100 is constituted by a DC electrical machine, then the rotor of the electrical machine is provided with a commutator and its matching brush seat and brush, and is further installed with the conduction wire leading to the conducting ring and the conducting ring as well as the brush and brush seat to match with the conducting ring;

If each corresponding rotor constituting the electrical machine rotor is of winding permanent excitation type, then the conducting ring is substituted for the commutator and the brush and brush seat are installed to match with the conducting ring;

If the field for electromechanical effect mutual driving with the afore said electrical machine rotor is permanent magnet type magnetic pole, installation of the excitation auxiliary interface is not required, therein if it is of winding type DC excitation field, then the excitation power input is provided through the conducting ring, brush and brush seat;

If the field excitation winding for electromechanical effect mutual driving with the electrical machine rotor is provided to generate rotational magnetic field, then the conducting ring, brush and brush seat are further installed according to the driven power required by the rotational magnetic field to accept power input;

If the afore said interactive rotor of the rotational magnetic field for electromechanical effect operation is squirrel type rotor or magnetic resistor type, or permanent magnet, or magnetic hysteresis, or eddy current type rotor, installation of the armature conduction auxiliary interface is not required.

Figure 2:
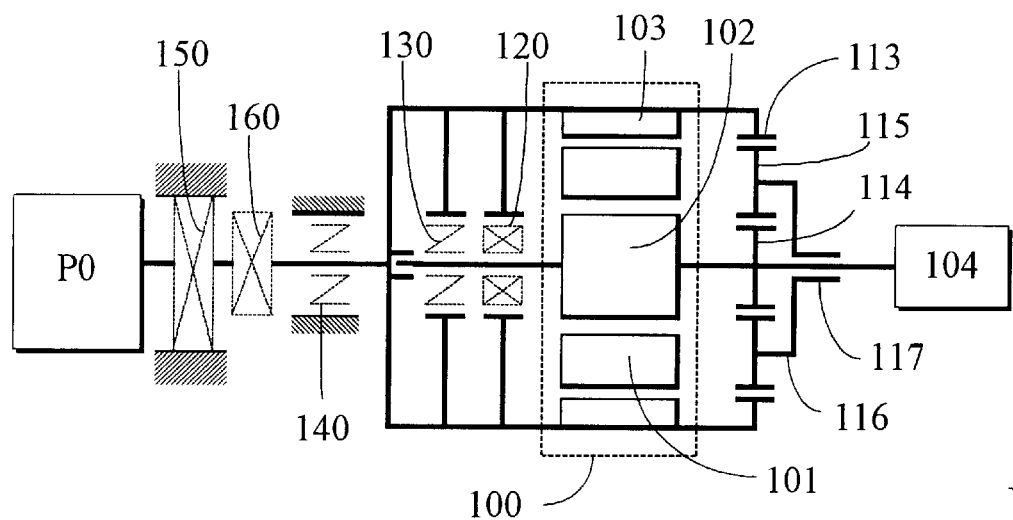
FIG. 2 is an embodying schematic diagram of the invention provided with a mechanical auxiliary interface.

(B) The delectable mechanical transmission auxiliary interface: it includes brakes, clutches, unidirectional transmission devices, electromechanical structure elements, carrier bearings and locking elements between the various transmission components and casing for selective installation, such as FIG. 2 is an embodying schematic diagram of the combined power driven device having a three-layered electromechanical structure with common structures provided with a mechanical auxiliary interface, wherein it is comprised of the following:

A clutch 120: It is installed as function required on the three-layered electromechanical structure with common structures 100, between the individual iterative rotors located between the active power source P0 and the load 104, wherein it can be lock closed or released either in rotation or at stand-still, whereof it can be controlled by the electric power, fluid power or mechanical power;

An unidirectional transmission structure 130 can be series installed as function required for unidirectional rotational kinetic energy transmission limitation on the three-layered common electromechanical structure, between the interactive rotors located between the power source P0 and the load 104, or between each interactive rotor and the casing static structure; or the afore said clutch 120 can be employed for bi-directional kinetic energy transmission;

An unidirectional structure 140 can be installed as function required between the rotation shaft of the active power source P0 and the casing static structure;

A brake 150 can be installed as function required between the rotation shaft of the active power source P0 and the casing static structure;

A clutch 160 can be installed as function required between the input/output shafts of the load and the active power source P0 coupled with the three-layered common electromechanical structure;

A differential wheel train: It is constituted by transmission components such as gears or friction wheels to have a sun wheel 114, planetary wheels 115 and outside ring wheel 113, whereof the planetary wheels 115 have two output types including the planetary wheel 115 with fixed center of axis to provide driving output or by steering the arm 106 to drive the input/output shaft 117, wherein the said three are selected as load required to couple with the middle layer common magnetic pole 101 or outer layer armature 103 or inner layer armature 102 of the afore said the three-layered electromechanical structure with common structures 100, or the rotation shaft of the load or to couple with the active power source P0 or the casing static structure or the load, thereby the matching combinations constitute the various type operation characteristics.

(C) The structure auxiliary interface includes the following:

A whole structure carrier includes the following:
1) Floating carrier: The said three-layered common electromechanical structure is coupled with the active power source P0, and is coupled with the load for output.
The three-layered electromechanical structure with common structures 100; or
2) The additionally installed carrier frame of the casing static structure is employed to carry both ends or one of the ends of the above said input/output shafts, thereby to further carry the three-layered electromechanical structure with common structures 100;
3) One of the outer layer armature 103, or middle layer common magnetic pole 101 or the inner layer armature 102 of the three-layered common electromechanical structure is combined with the casing static structure to carry the whole device unit, or an unidirectional transmission device or a clutch or both of them are installed between the afore said the three-layered electromechanical structure with common structures 100 and the casing static structure;
4) The casing static structure employed to match with the three-layered common electromechanical structure can be installed at the both sides or at one side.

Through the above said auxiliary interfaces to constitute the combined power driven device having a three-layered electromechanical structure with common structures, the various innovative functions are provided for application selections.

The combined power driven device having a three-layered electromechanical structure with common structures is mainly through the coupling status between each interactive armature, field as well as the active power source P0, load 104 and the casing static structure to have the diversity, i.e. The auxiliary transmission interfaces such as clutches, unidirectional transmission structures, brakes can be installed between the active power source P0 and the casing static structure, or between the active power source P0 and its driven the three-layered electromechanical structure with common structures 100 or between the coaxial interactive armature and common magnetic pole of the three-layered electromechanical structure with common structures 100 as well as the load, thereby to form selections of embodiment types as in the following:

One of the three-layered electromechanical structure with common structures 100 can be loci fixed with the casing static structure;

All of the three-layered common electromechanical structure are in free rotation status;

An unidirectional transmission device or a clutch or both can be installed between the middle layer common magnetic pole of the three-layered electromechanical structure with common structures 100 and the armature driven by the active power source P0;

An unidirectional transmission device or a clutch or both can be installed between the middle layer common magnetic pole of the three-layered electromechanical structure with common structures 100 and the casing static structure;

An unidirectional transmission device or a brake or both can be installed between the input/output shaft of the active power source P0 and the casing static structure;

An unidirectional transmission device, a clutch or a brake, or two or more than two of them simultaneously can be installed between the electromechanical device of the three-layered common electromechanical structure (which can be the middle layer common magnetic pole and/or its two coupled armatures), wherein it is not coupled with either the load or the casing static structure, thereby to control the said device's corresponding moving status;

Either One of the inner layer armature and outer layer armature can be independently provided with power input for motor operation, or can be independently driven by mechanical energy for generator operation;

Both of the inner layer armature and outer layer armature can be provided with power input simultaneously for motor operation, or can be driven by mechanical energy simultaneously for generator operation;

Through the selections and embodiments of the active power source P0 and the above said the three-layered electromechanical structure with common structures 100 as well as the various auxiliary transmission devices, the following major functions or other partial functions are constituted to include the following:

F1: A selectable and controllable diversified power source: The generation and transmission sequence of the driving power is active power source P0→ armature which is coupled with the active power source P0→ common magnetic pole P0→ armature which is coupled with the load→ load; wherein the kinetic energy supply includes the kinetic energy form the active power source P0, or the driving kinetic energy of the electromagnetic effect between the armature coupled with the active power source P0 and the common magnetic pole, or the driving kinetic energy of the electromagnetic effect between the armature coupled with the load and the common magnetic pole, wherein the above three rotational kinetic energy source can be controlled by transmission components to drive the load independently or together, thereof the above three rotational kinetic energy sources can be mutual transmitted bidirectionally, or can be operated in unidirectional transmission by installing an unidirectional transmission device;

F2: Two or more than two rotational kinetic energy sources in F1 can be mechanically inter-coupled through clutches to obtain torque addition thereby to drive the load together;

F3: Two or more than two rotational kinetic energy sources in F1 can be torque added through the electromechanical effect to obtain thereby to drive the load together;

F4: Two or more than two rotational kinetic energy sources in F1 can be speed added to drive the load together;

F5: The power generation of the three-layered electromechanical structure with common structures 100, wherein it includes: Either the rotating armature or field of the three-layered electromechanical structure with common structures 100 is driven by the active power source P0 to prevent the three-layered common electromechanical structure from driving other loads, and is operated independently as a generator, wherein the power output of the above said generator includes charging the battery or providing power to other loads, as well as driving the other loads by the active power source P0 according to the system needs;

F6: The three-layered electromagnetic structure with common structures 100 operated as a generator includes: An active power source P0 is employed to drive either one of the rotating armatures or fields of the three-layered electromagnetic structure with common structures 100, thereby to operate the said three-layered electromagnetic structure with common structures 100 as a generator to charge the battery, and use the battery to supply power to another armature of the three-layered electromagnetic structure with common structures 100 to be operated as a motor to drive its coupled loads;

F7: The three-layered electromagnetic structure with common structures 100 operated as a generator includes: An active power source P0 is employed to drive either one of the armatures or fields of the three-layered electromagnetic structure with common structures 100 to produce generator effect operation with the corresponding static structure, whereof the power is directly supplied to another armature of the three-layered electromagnetic structure with common structures 100 without through the battery to be operated as a motor to drive loads;

F8: The three-layered electromagnetic structure with common structures 100 operated as a generator includes: An active power source P0 is employed to drive either one of the armatures or fields of the three-layered electromagnetic structure with common structures 100 to provide differential kinetic energy coupled output to the load, whereof the differential coupled torque is generated from the generator function of the three-layered electromagnetic structure with common structures 100 between the active power source P0 and the load, and the generator power rate is controlled to constitute a differential kinetic energy coupled driven load, wherein the active power source P0 of the function can be operated at constant speed or variable speed;

F9: In F8's operation, one of the armature can be operated as a generator to provide the differential kinetic energy coupled output driving status, while to drive another armature of the three-layered electromagnetic structure with common structures 100 to charge the battery simultaneously or to supply power to other power consuming devices, wherein the generated loading torque of both devices form a common load to the engine for adjusting the torque of the engine in the different differential coupled output, whereby to allow the engine operated in a better efficiency;

F10: The two inner and outer layers of armatures of the three-layered electromagnetic structure with common structures 100 can be operated as generator and motor simultaneously, or one is operated as a generator and the other one is operated as a motor simultaneously, or one of them is operated independently as a generator or a motor;

F11: The power transmission between the active power source P0 and the load can be directly controlled through the open/close of the clutch;

F12: The reverse power operation includes: The load inertia driving the three-layered electromagnetic structure with common structures 100 operated as a generator for power regeneration brake, wherein the power of the regeneration can be consumed as a consumptive load or can be employed to charge a battery for storage or mixture of both;

F13: The reverse power operation includes: The engine is reverse driven by the kinetic energy of the load inertia through a clutch to constitute a braking function from the engine mechanical damping;

F14: The reverse power operation includes: The combined operation of the afore said F13 and F14;

F15: For the reverse power operation, if the active power source P0 is an internal engine, the engine can be started by supplying power to the three-layered electromagnetic structure with common structures 100 to operate it as a motor.

The combined power driven device having a three-layered electromechanical structure with common structures can be integrated into various interactive combination embodiments by selecting its relationships with the active power source P0, load 104, and the casing static structure, wherein each of the combination embodiments and functions include the following:

When the three-layered electromagnetic structure with common structures 100 appears in an coaxial multiple ring shaped interactive structure, its combination embodiments include the following:

The active power source P0 is coupled with the outer layer armature 103 of the three-layered electromagnetic structure with common structures 100, and the middle layer common magnetic pole 101 is locking fixed with the casing static structure, while the inner layer armature 102 is connected to the output shaft; or The active power source P0 is coupled with the middle layer common magnetic pole 101 of the three-layered electromagnetic structure with common structures 100, and the inner layer armature 102 is locking fixed with the casing static structure, while the outer layer armature 103 provides output to the load 104; or The active power source P0 is coupled with the middle layer common magnetic pole 101 of the three-layered electromagnetic structure with common structures 100, and the outer layer armature 103 is locking fixed with the casing static structure, while the inner layer armature 102 provides output to the load 104; or The active power source P0 is coupled with the inner layer armature 102, the outer layer armature 103 and the casing static structure, while the middle layer common magnetic pole 101 provides output to the load 104; or The active power source P0 is coupled with the inner layer armature 102, the middle layer common magnetic pole 101 and the casing static structure, while the outer layer armature 103 provides output to the load 104;

When the three-layered electromagnetic structure with common structures 100 appears in the multiple disk or cone layered structure, its combination embodiments include the following:

A middle layer disk (or cone)shaped common magnetic pole 121 is locking fixed with the casing static structure, while the two side disk (or cone) shaped armatures 122, 123 are respectively coupled with the active power source P0 and load 104; or A middle layer disk (or cone)shaped common magnetic pole 121 is locking fixed with the casing static structure, while one side disk (or cone) shaped armature is coupled with the load 104, while the other side disk (or cone) shaped armature is locking fixed with the casing static structure; or A middle layer disk (or cone)shaped common magnetic pole 121 is locking fixed with the casing static structure, while one side disk (or cone) shaped armature is coupled with the active power source P0, while the other side disk shaped armature is locking fixed with the casing static structure;

When the three-layered electromagnetic structure with common structures 100 appears in the outer layer ring shaped common magnetic pole coupled with the coaxial cylindrical armature structures, and its combination embodiments include the following:

An outer layer ring shaped common magnetic pole 131 is locking fixed with the casing static structure, wherein the coaxial cylindrical armatures 132, 133 are parallel installed at the middle and are respectively coupled with the active power source P0 and load 104; or An outer layer ring shaped common magnetic pole 131 is coupled with the active power source P0, wherein the coaxial cylindrical armatures 132, 133 are parallel installed at the middle, whereof one of the cylindrical armatures 133 is coupled with the load 104, while the other cylindrical armature 132 is locking fixed with the casing static structure; or An outer layer ring shaped common magnetic pole 131 is coupled with the load 104, wherein the coaxial cylindrical armatures 132, 133 are parallel installed at the middle, whereof one of the cylindrical armatures 132 is coupled with the active power source P0, while the other cylindrical armature 133 is locking fixed with the casing static structure;

When the three-layered electromagnetic structure with common structures 100 appears in a cylindrical common magnetic pole coupled with two coaxial outer layer ring shaped armatures, and its combination embodiments include the following:

A middle cylindrical common magnetic pole 141 is locking fixed with the casing static structure, while two coaxial outer layer ring shaped armatures 142, 143 are parallel installed and are respectively coupled with the active power source P0 and load 104; or A middle cylindrical common magnetic pole 141 is coupled with the active power source P0 while two coaxial ring shaped armatures 142, 143 are parallel installed at the outer layer, wherein one of the ring shaped armature 143 is coupled with the load 104, and the another ring shaped armature 142 is locking fixed with the casing static structure; or A middle cylindrical common magnetic pole 141 is coupled with the load 104 while two coaxial ring shaped armatures 142, 143 are parallel installed at the outer layer, wherein one of the ring shaped armature 142 is coupled with the active power source P0, and the other ring shaped armature 143 is locking fixed with the casing static structure.

Figure 3:
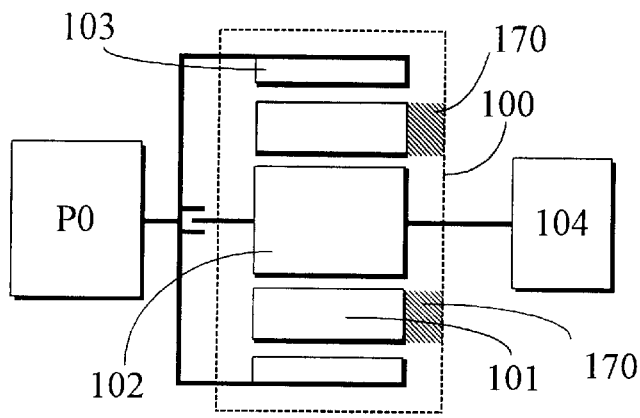
FIG. 3 is a brief embodying schematic diagram of an application example of the invention illustrating that the active power source is coupled with the outer layer armature of the three-layered electromechanical structure, wherein the field constitutes a middle layer common magnetic pole and is locking fixed with the casing static structure, while the inner layer armature is connected to the output shaft.

The interactive relationships and functions of the above said combination structures are described as following:

FIG. 3 is a brief embodying schematic diagram of an application example of the combined power driven device having a three-layered electromechanical structure with common structures illustrating that the active power source P0 is coupled with the outer layer armature of the three-layered electromechanical structure, wherein the field constitutes a middle layer common magnetic pole and is locking fixed with the casing static structure, while the inner layer armature is connected to the output shaft, wherein it is mainly comprised of the following:

A power source P0: It is a rotational power source driven by engine or other mechanical power or manpower;

the three-layered electromagnetic structure with common structures 100: It is a three-layered coaxial coupled structure with a middle layer common magnetic pole 101 and two independent armatures 102, 103, wherein the middle layer common magnetic pole 101 is locking fixed with the casing static structure, while the inner and outer layers are two independent armatures 102 and 103, each of them can be rotated freely, whereby the three layers constitute a coaxial interactive rotational close magnetic circuit, and the mechanical auxiliary interfaces can be selected as required to further install an unidirectional transmission device or a clutch or both of them between the outer layer armature 103, inner layer armature 102, middle layer common magnetic pole 101 of the afore said three-layered electromagnetic structure with common structures 100 to set the interactive status between the three, wherein the inner layer armature 102 can be controlled by the driving control device to provide positive/Reverse rotation and load driving varied speed motor function, or to be driven by the mechanical power for generator operation, while the outer layer armature 103 can be driven by the active power source P0 to provide generation function with its charging current to the battery controlled by the adjuster control device, or it can be driven by the input power for motor operation function, thereof the above said motor and generator functions can be operated independently or simultaneously, while the other functions can be referenced to the afore described F1~F15.

Figure 4:
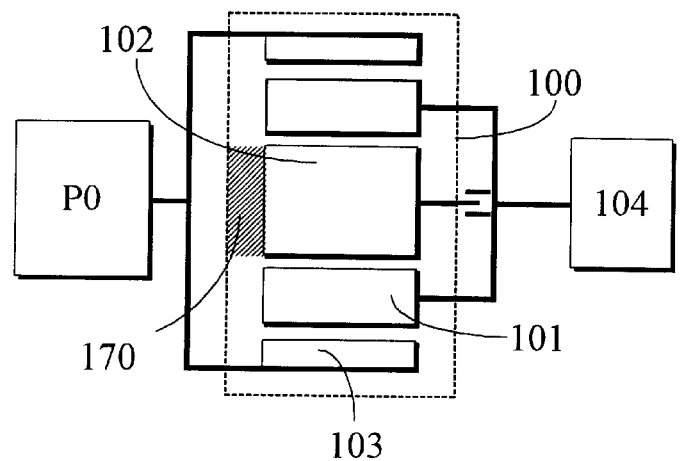
FIG. 4 is a brief embodying schematic diagram of an application example of the invention illustrating that the active power source is coupled with the outer layer armature of the three-layered electromechanical structure, wherein the middle layer common magnetic pole is connected to the output to drive the load, while the inner layer armature is locking fixed with the casing static structure.

FIG. 4 is a brief embodying schematic diagram of an application example of the combined power driven device having a three-layered electromechanical structure with common structures illustrating that the active power source is coupled with the outer layer armature of the three-layered electromechanical structure, wherein the middle layer common magnetic pole is connected to the output to drive the load, while the inner layer armature is locking fixed with the casing static structure, wherein it is mainly comprised of the following:

A power source P0: It is a rotational power source driven by engine or other mechanical power or manpower;

The three-layered electromagnetic structure with common structures 100: It is a three-layered coaxial coupled structure with a middle layer common magnetic pole 101 and two independent armatures 102, 103, wherein the load 104 is driven by the middle layer common magnetic pole 101, and the inner layer armature 102 is locking fixed with the casing static structure, while the outer layer armature 103 is coupled with the active power source P0 and can be rotated freely with the inner layer armature 102, whereby the three layers constitute a coaxial interactive rotational close magnetic circuit, and the mechanical auxiliary interfaces can be selected as required to further install an unidirectional transmission device or a clutch or both of them between the outer layer armature 103, inner layer armature 102, middle layer common magnetic pole 101 of the afore said three-layered electromagnetic structure with common structures 100 to set the interactive status between the three, wherein the inner layer armature 102 can be controlled by the driving control device to further generate a reaction force to drive the middle layer common magnetic pole 101 for positive/Reverse rotation and load driving varied speed motor function, or to be driven by the mechanical power for generator operation, while the outer layer armature 103 can be driven by the active power source P0 to provide generation function with its charging current to the battery controlled by the adjuster control device, or it can be driven by the input power for motor operation function, thereof the above said motor and generator functions can be operated independently or simultaneously, while the other functions can be referenced to the afore described F1~F15, and besides of that a brake can be further installed between the middle magnetic pole structure and the output shaft.

Figure 5:
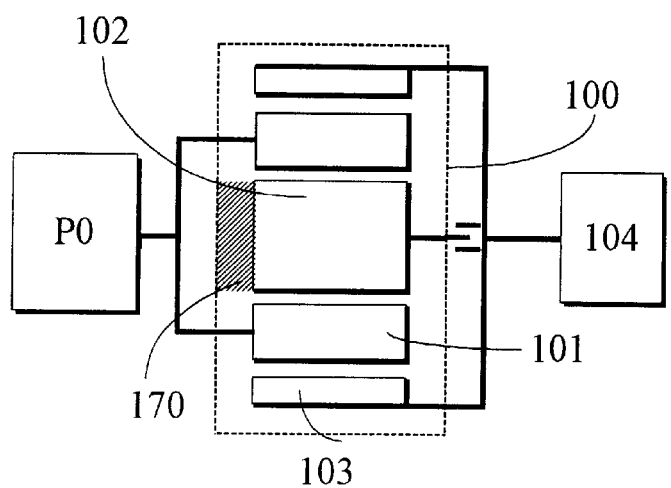
FIG. 5 is a brief embodying schematic diagram of an application example of the invention illustrating that the active power source is coupled with the middle layer common magnetic pole of the three-layered electromechanical structure, wherein the inner layer armature is locking fixed with the casing static structure, while the outer layer armature provides output to drive the load.

FIG. 5 is a brief embodying schematic diagram of an application example of the combined power driven device having a three-layered electromechanical structure with common structures illustrating that the active power source is coupled with the middle layer common magnetic pole of the three-layered electromechanical structure, wherein the inner layer armature is locking fixed with the casing static structure, while the outer layer armature provides output to drive the load, wherein it is mainly comprised of the following:

A power source P0: It is a rotational power source driven by engine or other mechanical power or manpower;

The three-layered electromagnetic structure with common structures 100: It is a three-layered coaxial coupled structure with a middle layer common magnetic pole 101 and two independent armatures 102, 103, wherein the middle layer common magnetic pole structure 101 is coupled with the active power source P0 and the inner layer armature 102 is locking fixed with the casing static structure, while the load 104 is driven by the outer layer armature 103, whereby the three layers constitute a close magnetic circuit and can be interactively rotated at the same axis, and the mechanical auxiliary interfaces can be selected as required to further install an unidirectional transmission device or a clutch or both of them between the outer layer armature 103, inner layer armature 102, middle layer common magnetic pole 101 of the afore said three-layered electromagnetic structure with common structures 100 to set the interactive status between the three layers, wherein they are mutually driven by rotation shaft of the active power source P0, therefore a brake shall be further installed between the rotation shaft and the casing static structure, wherein the outer layer armature 103 is controlled by the driving control device to provide motor function for positive/Reverse rotation and varied speed load driving, or to be driven by the mechanical power for generator operation, while the inner layer armature 102, with the middle layer common magnetic pole 101 driven by the active power source P0 can provide generation function with its charging current to the battery controlled by the adjuster control device, or it can be driven by the input power for motor operation function, thereof the above said motor and generator functions can be operated independently or simultaneously, i.e. if the rotation direction of the active power source P0 driving the middle layer common magnetic pole 101 and rotation direction of the middle layer common magnetic pole 101 driving the load are the same, then a power addition output can be obtained. At this time, the armature locking fixed with the casing static structure appeared at OFF state, whereby besides of providing generation output, it can be charged with current to produce auxiliary driving torque to the middle layer common magnetic pole 101 and drive the load 104 together; thereof if the active power source P0 is an internal engine, then a clutch can be installed between the middle layer common magnetic pole 101 and the outer layer armature 103 which provides loading output, whereby when the clutch is closed, the load is driven by the engine directly or another armature can be charged with current to constitute that the motor and the engine drive the load together or when the engine is reverse driven by the load, the engine constitutes a load side damping, thereof the other functions can be refereed to the afore described F1~F15.

Figure 6:
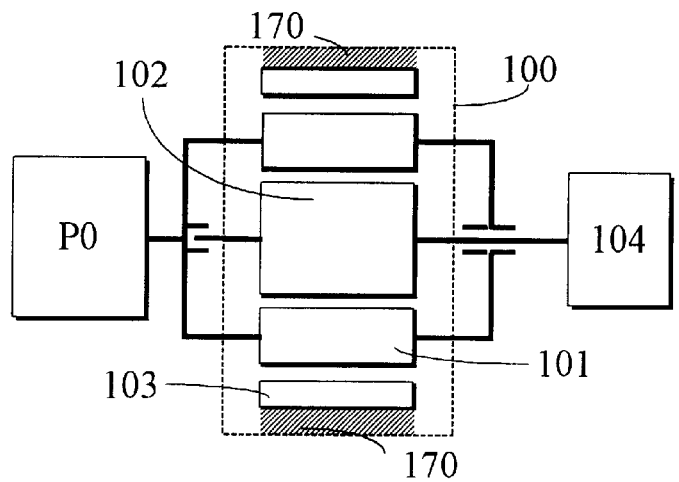
FIG. 6 is a brief embodying schematic diagram of an application example of the invention illustrating that the active power source is coupled with the middle layer common magnetic pole of the three-layered electromechanical structure, wherein the outer layer armature is locking fixed with the casing static structure, while the inner layer armature provides output to drive the load.

FIG. 6 is a brief embodying schematic diagram of an application example of the combined power driven device having a three-layered electromechanical structure with common structures illustrating that the active power source is coupled with the middle layer common magnetic pole of the three-layered electromechanical structure, wherein the outer layer armature is locking fixed with the casing static structure, while the inner layer armature provides output to drive the load, wherein it is mainly comprised of the following:

A power source P0: It is a rotational power source driven by engine or other mechanical power or manpower;

The three-layered electromagnetic structure with common structures 100: It is a three-layered coaxial coupled structure with a middle layer common magnetic pole 101 and two independent armatures 102, 103, wherein the middle layer common magnetic pole structure 101 is coupled with the active power source P0 and the outer layer armature 103 is locking fixed with the casing static structure, while the load 104 is driven by the inner layer armature 102, whereby the three layers constitute a close magnetic circuit and can be interactively rotated at the same axis, and the mechanical auxiliary interfaces can be selected as required to further install an unidirectional transmission device or a clutch or both of them between the outer layer armature 103, inner layer armature 102, middle layer common magnetic pole 101 of the afore said three-layered electromagnetic structure with common structures 100 to set the interactive status between the three layers, wherein the inner layer armature 102 is controlled by the driving control device to provide positive/Reverse rotation and varied speed motor functions to drive the load 104, or to be driven by the mechanical power for generator operation, while the outer layer armature 103 is driven by the active power source P0 to provide generation function with its charging current to the battery controlled by the adjuster control device, or it can be driven by the input power for motor operation function, thereof the above said motor and generator functions can be operated independently or simultaneously, i.e. if the rotation direction of the active power source P0 driving the middle ring layer fields and the rotation direction of the motor operation constituted by the middle layer common magnetic pole 101 and the load side armature are the same, then a power addition output can be obtained. At this time, the armature locking fixed with the casing static structure appeared at OFF state, whereby besides of providing generation output, it can be charged with current to produce auxiliary driving torque to the middle layer common magnetic pole 101 and drive the load together; thereof a brake can be installed between the middle layer common magnetic pole 101 coupled with the active power source P0 and casing static structure for selective locking to drive the inner layer armature, and a clutch can be further installed between the middle layer common magnetic pole 101 and the armature to allow the load to be driven by the engine directly or when the engine is reverse driven by the load, to let the engine constitute a load side damping, thereof the other functions can be refereed to the afore described F1~F15.

Figure 7:
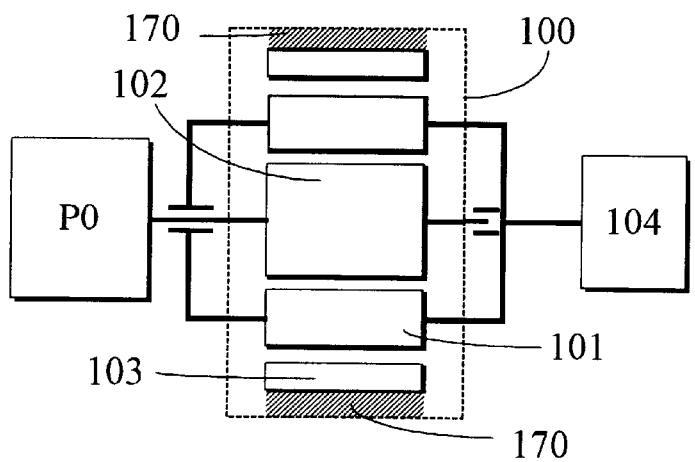
FIG. 7 is a brief embodying schematic diagram of an application example of the invention illustrating that the active power source is coupled with the inner layer armature of the three-layered electromechanical structure, wherein the outer layer armature is locking fixed with the casing static structure, while the middle layer common magnetic pole provides output to drive the load.

FIG. 7 is a brief embodying schematic diagram of an application example of the combined power driven device having a three-layered electromechanical structure with common structures illustrating that the active power source is coupled with the inner layer armature of the three-layered electromechanical structure, wherein the outer layer armature is locking fixed with the casing static structure, while the middle layer common magnetic pole provides output to drive the load, wherein it is mainly comprised of the following:

A power source P0: It is a rotational power source driven by engine or other mechanical power or manpower;

The three-layered electromagnetic structure with common structures 100: It is a three-layered coaxial coupled structure with a middle layer common magnetic pole 101 and two independent armatures 102, 103, wherein the load 104 is driven by the middle layer common magnetic pole structure 101 and the outer layer armature 103 is locking fixed with the casing static structure, while the inner layer armature 102 is coupled with the active power source P0, whereby the three layers constitute a close magnetic circuit and can be interactively rotated at the same axis, and the mechanical auxiliary interfaces can be selected as required to further install an unidirectional transmission device or a clutch or both of them between the outer layer armature 103, inner layer armature 102, middle layer common magnetic pole 101 of the afore said three-layered electromagnetic structure with common structures 100 to set the interactive status between the three layers, wherein the outer layer armature 103 is controlled by the driving control device to further drive the middle layer common magnetic pole 101 by reaction force for positive/Reverse rotation and load driving varied speed motor functions, or to be driven by the mechanical power for generator operation, while the inner layer armature 102 is driven by the active power source P0 to provide generation function with its charging current to the battery controlled by the adjuster control device, or it can be driven by the input power for motor operation function, thereof the above said motor and generator functions can be operated independently or simultaneously, wherein a brake is installed between the middle layer common magnetic pole 101 coupled with the output shaft and the casing static structure for selective locking to drive the inner layer armature 102 to start the engine, to allow the inner layer armature 102 driven by the engine provide generation function at locking status, thereof a clutch can be further installed between the middle layer common magnetic pole 101 and the inner layer armature 102, thereby when the clutch is closed to allow the load to be driven by the engine directly or when the engine is reverse driven by the load, to let the engine constitute a load side damping, thereof the other functions can be refereed to the afore described F1~F15.

Figure 8:
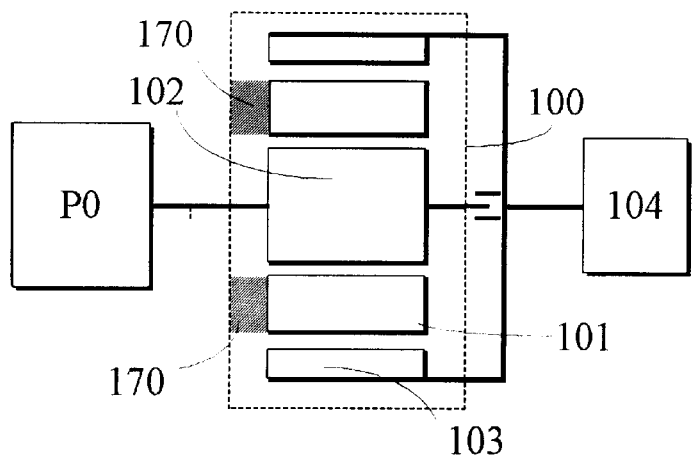
FIG. 8 is a brief embodying schematic diagram of an application example of the invention illustrating that the active power source is coupled with the inner layer armature of the three-layered electromechanical structure, wherein the middle layer common magnetic pole is locking fixed with the casing static structure, while the outer layer armature provides output to drive the load.

FIG. 8 is a brief embodying schematic diagram of an application example of the combined power driven device having a three-layered electromechanical structure with common structures illustrating that the active power source is coupled with the inner layer armature of the three-layered electromechanical structure, wherein the middle layer common magnetic pole is locking fixed with the casing static structure, while the outer layer armature provides output to drive the load, wherein it is mainly comprised of the following:

A power source P0: It is a rotational power source driven by engine or other mechanical power or manpower;

The three-layered electromagnetic structure with common structures 100: It is a three-layered coaxial coupled structure with a middle layer common magnetic pole 101 and two independent armatures 102, 103, wherein the middle layer common magnetic pole structure 101 is locking fixed with the casing static structure and the load is driven by the outer layer armature 103, while the inner layer armature 102 is coupled with the active power source P0, whereby the three layers constitute a close magnetic circuit and can be interactively rotated at the same axis, and the mechanical auxiliary interfaces can be selected as required to further install an unidirectional transmission device or a clutch or both of them between the outer layer armature 103, inner layer armature 102, middle layer common magnetic pole 101 of the afore said three-layered electromagnetic structure with common structures 100 to set the interactive status between the three layers, wherein the outer layer armature 103 is controlled by the driving control device to provide positive/Reverse rotation and load driving varied speed motor functions, or to be driven by the mechanical power for generator operation, while the inner layer armature 102 is driven by the active power source P0 to provide generation function with its charging current to the battery controlled by the adjuster control device, or it can be driven by the input power for motor operation function, thereof the above said motor and generator functions can be operated independently or simultaneously, i.e. when the load side armature is driven by the battery current, the engine can be operated simultaneously as an armature of a generator to charge the battery, thereof if the active power source P0 is an internal engine, then the inner layer armature 102 can be provided with input power to function as a motor to start the engine, or a clutch can be installed between the load and the armature coupled with the engine, whereby when the clutch is closed, the load is driven by the engine directly or the load side armature is charged with current to constitute a motor and to drive the load with the engine together, or when the engine is reverse driven by the load, the engine constitutes a load side damping, thereof the other functions can be refereed to the afore described F1~F15.

Figure 9:
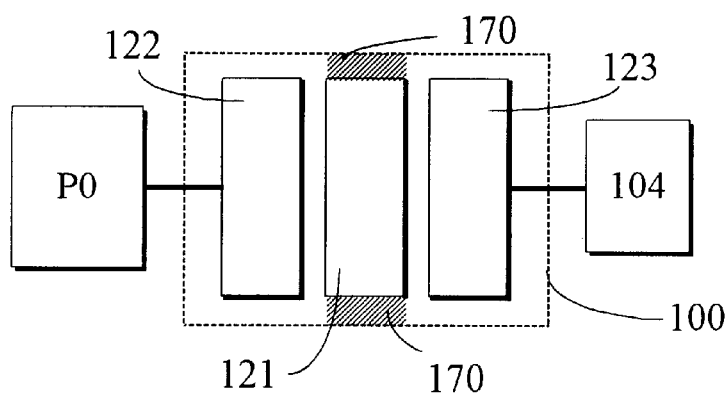
FIG. 9 is the first schematic diagram of the embodying example of the invention illustrating a three-layered electromechanical structure appeared in a multiple disk (or cone) layered structure.

FIG. 9 is a schematic diagram of the embodying example of the combined power driven device having a three-layered electromechanical structure with common structures illustrating that the middle disk (or cone) shaped common magnetic pole is locking fixed with the casing static structure, while the two side disk (or cone) shaped armatures are respectively coupled with the active power source P0 and load, wherein it is mainly comprised of the following:

A power source P0: It is a rotational power source driven by engine or other mechanical power or manpower;

The three-layered electromagnetic structure with common structures 100: It is a three-layered coaxial coupled structure with a middle disk (or cone) shaped common magnetic pole 121 and two independent disk shaped armatures 122, 123, wherein the middle disk (or cone) shaped common magnetic pole structure 121 is locking fixed with the casing static structure and the load is driven by one of the side disk (or cone) shaped armature 123, while the other disk (or cone) shaped armature 122 is coupled with the active power source P0, whereby the three layers constitute a close magnetic circuit and can be interactively rotated at the same axis, and the mechanical auxiliary interfaces can be selected as required to further install an unidirectional transmission device or a clutch or both of them between the two side disk (or cone) shaped armatures 122, 123, and the middle disk (or cone) shaped common magnetic pole 121 of the afore said three-layered electromechanical structure 100 to set the interactive status between the three layers, wherein one of the side armatures is controlled by the driving control device to provide positive/Reverse rotation and load driving varied speed motor functions, or to be driven by the mechanical power for generator operation, while the other side armature is driven by the active power source P0 to provide generation function with its charging current to the battery controlled by the adjuster control device, or it can be driven by the input power for motor operation function, thereof the above said motor and generator functions can be operated independently or simultaneously, i.e. when the load side armature is driven by the battery current, the engine can be operated simultaneously as an armature of a generator to charge the battery, thereof if the active power source P0 is an Internal engine, then the armature coupled with the active power source P0 can be provided with input power to function as a motor to start the engine, or a clutch can be installed between the load and the armature coupled with the engine, whereby when the clutch is closed, the load is driven by the engine directly or the load side armature is charged with current to constitute a motor and to drive the load with the engine together, or when the engine is reverse driven by the load, the engine constitutes a load side damping, thereof the other functions can be refereed to the afore described F1~F15.

Figure 10:
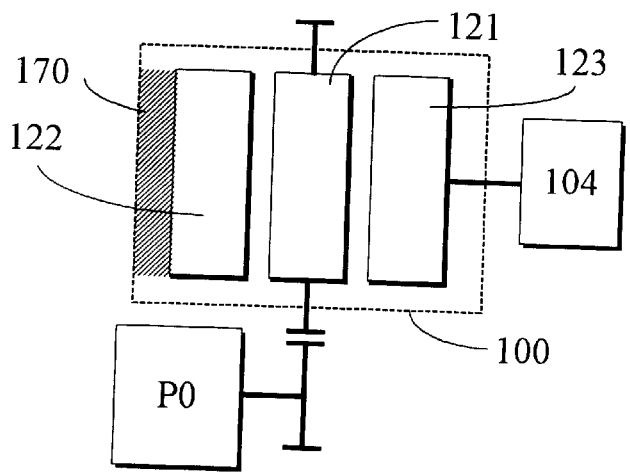
FIG. 10 is the second schematic diagram of the embodying example of the invention illustrating a three-layered electromechanical structure appeared in a multiple disk (or cone) layered structure.

FIG. 10 is a schematic diagram of the embodying example of the combined power driven device having a three-layered electromechanical structure with common structures illustrating that the middle disk (or cone) shaped common magnetic pole is coupled with the active power source P0, and one of the two side disk (or cone) shaped armatures is coupled with the load, while the other side disk (or cone) shaped armature is coupled with the casing static structure, wherein it is mainly comprised of the following:

A power source P0: It is a rotational power source driven by engine or other mechanical power or manpower;

The three-layered electromagnetic structure with common structures 100: It is a three-layered coaxial coupled structure with a middle disk (or cone) shaped common magnetic pole 121 and two independent disk shaped armatures 122, 123, wherein the middle disk (or cone) shaped common magnetic pole structure 121 is coupled with the active power source P0 directly or through a transmission component, and one of the side disk (or cone) shaped armatures 122, 123 is locking fixed with the casing static structure, while the other armature is connected to the load 104, whereby the three layers constitute a close magnetic circuit and can be interactively rotated at the same axis, and the mechanical auxiliary interfaces can be selected as required to further install an unidirectional transmission device or a clutch or both of them between the two side disk (or cone) shaped armatures 122, 123, and the middle disk (or cone) shaped common magnetic pole 121 of the afore said three-layered electromechanical structure 100 to set the interactive status between the three layers, and they are mutually driven by the rotation shaft of the active power source P0, therefore a brake shall be further installed between the rotation shaft and the casing static structure, wherein the armature coupled with the load is controlled by the driving control device to drive the magnetic pole through the reaction force to provide positive/Reverse rotation and load driving varied speed motor functions, while the armature locking fixed with the casing static structure provides a generation function when the middle disk (or cone) common structure is driven by the active power source P0, or to be driven by the mechanical power for generator operation with its charging current to the battery controlled by the adjuster control device, or it can be driven by the input power for motor operation function, thereof the above said motor and generator functions can be operated independently or simultaneously, i.e. when the load side armature is driven by the battery current, the engine can be operated simultaneously as an armature of a generator to charge the battery, thereof if the active power source P0 is an internal engine, then a clutch can be further installed between the middle layer disk (or cone) shaped magnetic pole and the disk shaped armature connected to the load, whereby when the clutch is closed, the load is driven by the engine directly or another side disk shaped armature is simultaneously charged with current to constitute a motor and to drive the load with the engine together, or when the engine is reverse driven by the load, the engine constitutes a load side damping, thereof the other functions can be refereed to the afore described F1~F15.

Figure 11:
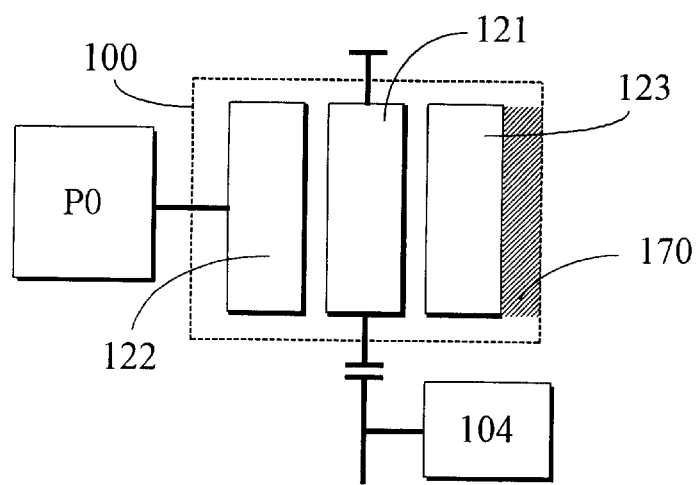
FIG. 11 is the third schematic diagram of the embodying example of the invention illustrating a three-layered electromechanical structure appeared in a multiple disk (or cone) layered structure.

FIG. 11 is a schematic diagram of the embodying example of the combined power driven device having a three-layered electromechanical structure with common structures illustrating that the middle layer disk (or cone) shaped common magnetic pole is coupled with the load, and one of the two side disk (or cone) shaped armatures is coupled with the active power source P0, while the other disk (or cone) shaped armature is locking fixed with the casing static structure, wherein it is mainly comprised of the following:

A power source P0: It is a rotational power source driven by engine or other mechanical power or manpower;

The three-layered electromagnetic structure with common structures 100: It is a three-layered coaxial coupled structure with a middle disk (or cone) shaped common magnetic pole 121 and two independent disk shaped armatures 122, 123, wherein the middle disk (or cone) shaped common magnetic pole structure 121 is coupled with the load 104 directly or through a transmission component, and one of the side disk (or cone) shaped armatures 122,123 is locking fixed with the casing static structure, while the other armature is coupled with the active power source P0, whereby the three layers constitute a close magnetic circuit and can be interactively rotated at the same axis, and the mechanical auxiliary interfaces can be selected as required to further install an unidirectional transmission device or a clutch or both of them between the two side disk (or cone) shaped armatures 122, 123, and the middle disk (or cone) shaped common magnetic pole 121, of the afore said three-layered electromechanical structure 100 to set the interactive status between the three layers, wherein one of the side armatures is controlled by the driving control device to drive the middle layer disk (or cone) shaped common magnetic pole through the reaction force to provide positive/Reverse rotations and load driving varied speed motor functions, or to be driven by the mechanical power for generator operation, while the other side armature is driven by the active power source P0 to provide power generation function with its charging current to the battery controlled by the adjuster control device, or it can be driven by the input power for motor operation function, thereof the above said motor and generator functions can be operated independently or simultaneously, thereof if the active power source P0 is an internal engine, then a clutch can be further installed between the middle layer disk (or cone) shaped magnetic pole and the load, whereby when the clutch is closed, the load is driven by the engine directly or another side disk shaped armature is simultaneously charged with current to constitute a motor and to drive the load with the engine together, or when the engine is reverse driven by the load, the engine constitutes a load side damping, thereof the other functions can be refereed to the afore described F1~F15.

Figure 12:
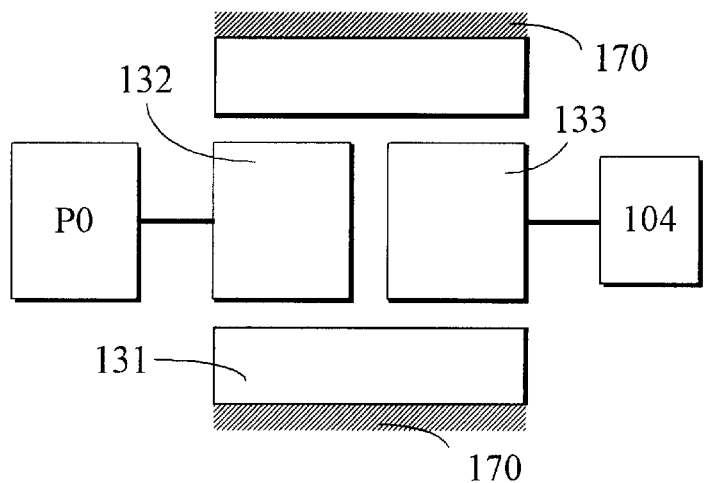
FIG. 12 is the first schematic diagram of the embodying example of the invention illustrating a three-layered electromechanical structure appeared in the ring shaped common magnetic poles, wherein two coaxial cylindrical armatures are parallel installed.

FIG. 12 is a schematic diagram of the embodying example of the combined power driven device having a three-layered electromechanical structure with common structures illustrating that the outer layer appears in a ring shaped common magnetic pole, wherein two coaxial cylindrical armatures are parallel installed and are locking fixed with the casing static structure. Wherein its coaxial inner layer is parallel installed with two cylindrical armatures which are coupled with the active power source P0 and the load respectively, wherein it is mainly comprised of the following:

A power source P0: It is a rotational power source driven by engine or other mechanical power or manpower;

The three-layered electromagnetic structure with common structures 100: The outer layer ring shaped common magnetic pole 131 is coupled with the two independent inner layer cylindrical armatures 132, 133 at the same axis, wherein the outer ring shaped common magnetic pole 131 is locking fixed with the casing static structure and the load is driven by one of the cylindrical armatures 133, while the active power source P0 is coupled with the other cylindrical armature 132, whereby the three armatures constitute a close magnetic circuit and can be interactively rotated at the same axis, and the mechanical auxiliary interfaces can be selected as required to further install an unidirectional transmission device or a clutch or both of them between the two cylindrical armatures 132, 133, and the ring shaped magnetic pole 131 of the afore said three-layered electromechanical structure 100 to set the interactive status between the three armatures, wherein one of the side armatures is controlled by the driving control device to provide the positive/Reverse rotations and load driving varied speed motor functions, or to be driven by the mechanical power for generator operation, while the other side armature is driven by the active power source P0 to provide power generation function with its charging current to the battery controlled by the adjuster control device, or it can be driven by the input power for motor operation function, thereof the above said motor and generator functions can be operated independently or simultaneously, thereof if the load side armature is driven by the battery current, the engine can be operated simultaneously as an armature of a generator to charge the battery, thereof if the active power source is an internal engine, the armature coupled with the active power source P0 can be provided with power input to produce motor function to start the engine, or a clutch can be further installed between the load and the armature coupled with the engine, whereby when the clutch is closed, the load is driven by the engine directly or the load side armature is charged with current to constitute a motor and to drive the load with the engine together, or when the engine is reverse driven by the load, the engine constitutes a load side damping, thereof the other functions can be refereed to the afore described F1~F15.

Figure 13:
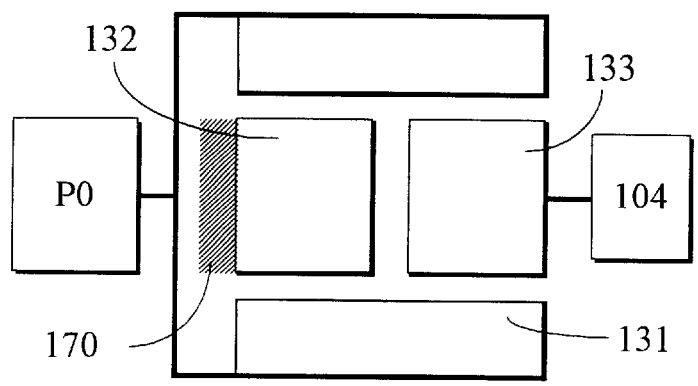
FIG. 13 is the second schematic diagram of the embodying example of the invention illustrating a three-layered electromechanical structure appeared in the ring shaped common magnetic poles, wherein two coaxial cylindrical armatures are parallel installed.

FIG. 13 is a schematic diagram of the embodying example of the combined power driven device having a three-layered electromechanical structure with common structures illustrating that the outer layer appears in a ring shaped common magnetic pole and is coupled with the active power source P0, wherein two coaxial cylindrical armatures are parallel installed at the inner layer and one of the armatures is coupled with the load while the other armature is coupled with the casing static structure, wherein it is mainly comprised of the following:

A power source P0: It is a rotational power source driven by engine or other mechanical power or manpower;

The three-layered electromagnetic structure with common structures 100: The outer layer ring shaped common magnetic pole 131 is coupled with the two independent inner layer cylindrical armatures 132, 133 at the same axis, wherein the outer ring shaped common magnetic pole 131 is coupled with the active power source P0 directly or through a transmission component and one of the inner layer cylindrical armatures 132,133 is locking fixed with the casing static structure, while the other armature is connected to the load 104, whereby the three armatures constitute a close magnetic circuit and can be interactively rotated at the same axis, and the mechanical auxiliary interfaces can be selected as required to further install an unidirectional transmission device or a clutch or both of them between the two cylindrical armatures 132, 133, and the ring shaped magnetic pole 131 of the afore said three-layered electromechanical structure 100 to set the interactive status between the three armatures, and the said structure is mutually driven by the rotation shaft of the active power source P0, therefore a brake shall be installed between the rotation shaft and the static structure, whereby the armature coupled with the load can be controlled by the driving control device to provide the positive/Reverse rotations and load driving varied speed motor functions, while the armature locking fixed with the casing static structure is driven by the active power source P0 to provide generator operation with its charging current to the battery controlled by the adjuster control device, or it can be driven by the input power for motor operation function, thereof the above said motor and generator functions can be operated independently or simultaneously, thereof if the active power source is an internal engine, a clutch can be further installed between the ring shaped common magnetic structure and the armature connected to the load, whereby when the clutch is closed, the load is driven by the engine directly or the other armature is charged with current simultaneously to constitute a motor and to drive the load with the engine together, or when the engine is reverse driven by the load, the engine constitutes a load side damping, thereof the other functions can be refereed to the afore described F1~F15.

Figure 14:
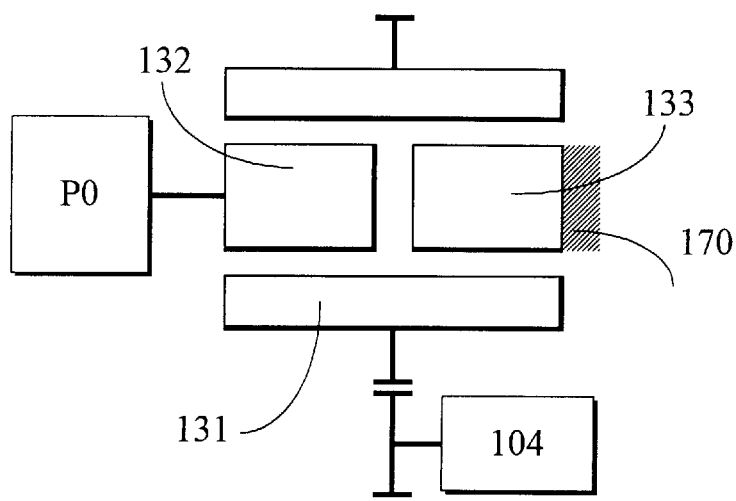
FIG. 14 is the third schematic diagram of the embodying example of the invention illustrating a three-layered electromechanical structure appeared in the ring shaped common magnetic poles, wherein two coaxial cylindrical armatures are parallel installed.

FIG. 14 is a schematic diagram of the embodying example of the combined power driven device having a three-layered electromechanical structure with common structures illustrating that the outer layer is in ring shaped common magnetic pole and is coupled with the load, whereof its inner layer is parallel installed with two coaxial cylindrical armatures, whereof one of the armatures is coupled with the active power source P0 and the other armature is locking fixed with the casing static structure, wherein it is mainly comprised of the following:

A power source P0: It is a rotational power source driven by engine or other mechanical power or manpower;

The three-layered electromagnetic structure with common structures 100: The outer layer ring shaped common magnetic pole 131 is coupled with the two independent inner layer cylindrical armatures 132, 133 at the same axis, wherein the outer ring shaped common magnetic pole 131 is coupled with the load 104 directly or through a transmission component and one of the two inner layer cylindrical armatures 132,133 is locking fixed with the casing static structure, while the other armature is connected to the active power source P0, whereby the three armatures constitute a close magnetic circuit and can be interactively rotated at the same axis, and the mechanical auxiliary interfaces can be selected as required to further install an unidirectional transmission device or a clutch or both of them between the two cylindrical armatures 132, 133, and the ring shaped magnetic pole 131 of the afore said three-layered electromechanical structure 100 to set the interactive status between the three armatures, wherein one of the side armatures is controlled by the driving control device to drive the ring shaped common magnetic pole through the reaction force to provide positive/Reverse rotations and load driving varied speed motor functions, or to be driven by the mechanical power to provide generator functions, while the other side armature is driven by the active power source P0 to provide a generator operation with its charging current to the battery controlled by the adjuster control device, or it can be driven by the input power for motor operation function, thereof the above said motor and generator functions can be operated independently or simultaneously, thereof if the active power source is an internal engine, a clutch can be further installed between the ring shaped common magnetic structure and the load, whereby when the clutch is closed, the load is driven by the engine directly or the other armature is charged with current simultaneously to constitute a motor and to drive the load with the engine together, or when the engine is reverse driven by the load, the engine constitutes a load side damping, thereof the other functions can be refereed to the afore described F1~F15.

Figure 15:
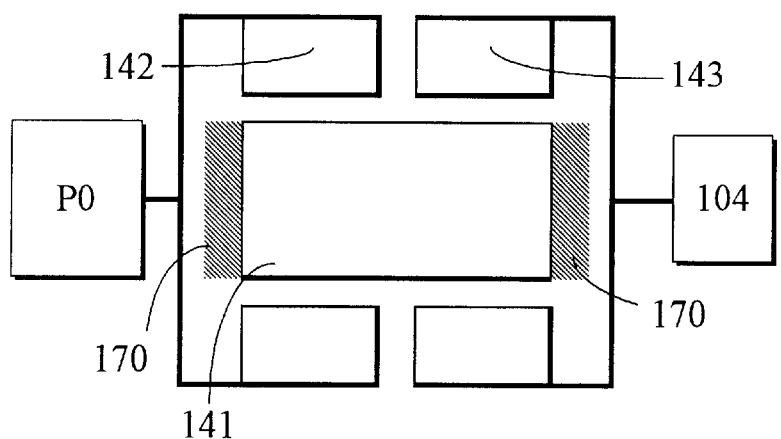
FIG. 15 is the first schematic diagram of the embodying example of the invention illustrating a three-layered electromechanical structure, wherein its outer layer is installed with two coaxial ring shaped armature, while a coaxial cylindrical common magnetic pole is installed at the middle.

FIG. 15 is a schematic diagram of the embodying example of the combined power driven device having a three-layered electromechanical structure with common structures illustrating that the middle cylindrical common magnetic pole is locking fixed with the casing static structure, while two outer layer coaxial ring shaped armatures are installed with the active power source P0 and the load respectively, wherein it is mainly comprised of the following: A power source P0: It is a rotational power source driven by engine or other mechanical power or manpower;

The three-layered electromagnetic structure with common structures 100: The middle cylindrical common magnetic pole 141 is coupled with the two independent outer layer ring shaped armatures 142, 143 at the same axis, wherein the middle cylindrical common magnetic pole 141 is locking fixed with the casing static structure and the load is driven by one of the two outer layer ring shaped armatures 143, while the other armature 142 is coupled with the active power source P0, whereby the three armatures constitute a close magnetic circuit and can be interactively rotated at the same axis, and the mechanical auxiliary interfaces can be selected as required to further install an unidirectional transmission device or a clutch or both of them between the two outer layer ring shaped armatures 142, 143, and the cylindrical common magnetic pole 141 of the afore said three-layered electromechanical structure 100 to set the interactive status between the three armatures, wherein one of the side armatures is controlled by the driving control device to provide positive/Reverse rotations and load driving varied speed motor functions, or to be driven by the mechanical power to provide generator functions, while the other side armature is driven by the active power source P0 to provide a generator operation with its charging current to the battery controlled by the adjuster control device, or it can be driven by the input power for motor operation function, thereof the above said motor and generator functions can be operated independently or simultaneously, thereof if the active power source is an internal engine, the armature coupled with the active power source P0 can be provided with power input to produce a motor function to start the engine, or a clutch can be further installed between the armature coupled with the engine and the armature coupled with the load, whereby when the clutch is closed, the load is driven by the engine directly or the other armature is charged with current simultaneously to constitute a motor and to drive the load with the engine together, or when the engine is reverse driven by the load, the engine constitutes a load side damping, thereof the other functions can be refereed to the afore described F1~F15.

Figure 16:
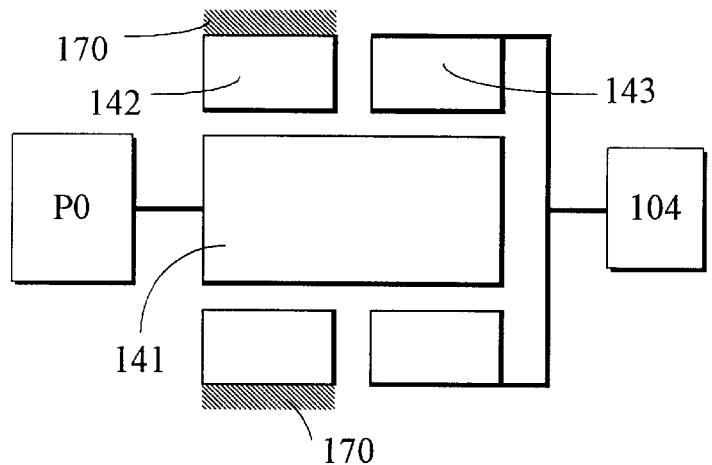
FIG. 16 is the second schematic diagram of the embodying example of the invention illustrating a three-layered electromechanical structure, wherein its outer layer is installed with two coaxial ring shaped armature, while a coaxial cylindrical common magnetic pole is installed at the middle.

FIG. 16 is a schematic diagram of the embodying example of the combined power driven device having a three-layered electromechanical structure with common structures illustrating that the middle cylindrical common magnetic pole is coupled with the active power source P0 and its outer layer is parallel installed with two coaxial ring shaped armatures, wherein one of the ring shaped armature is coupled with the load and while the other ring shaped armature is coupled with the casing static structure, wherein it is mainly comprised of the following:

A power source P0: It is a rotational power source driven by engine or other mechanical power or manpower;

The three-layered electromagnetic structure with common structures 100: The middle cylindrical common magnetic pole 141 and the two coaxial independent outer layer ring shaped armatures 142, 143 are appeared in a three-layered coaxial coupling structure, wherein the middle cylindrical common magnetic pole 141 is coupled with the active power source P0 directly or through a transmission component and one of the two outer layer ring shaped armatures 142,143 is locking fixed with the casing static structure, while the other armature is connected to the load, whereby the three armatures constitute a close magnetic circuit and can be interactively rotated at the same axis, and the mechanical auxiliary interfaces can be selected as required to further install an unidirectional transmission device or a clutch or both of them between the two outer layer ring shaped armatures 142, 143, and the cylindrical common magnetic pole 141 of the afore said three-layered electromechanical structure 100 to set the interactive status between the three armatures, wherein the said structure is mutually driven by rotation shaft of the active power source P0, therefor a brake is further installed between the rotation shaft and the casing static structure, wherein the armature coupled with the load is controlled by the driving control device to drive the magnetic pole to provide positive/Reverse rotations and load driving varied speed motor functions, or to be driven by the mechanical power to provide generator functions, while the armature locking fixed with the casing static structure is driven by the active power source P0 to provide a generator operation with its charging current to the battery controlled by the adjuster control device, or it can be driven by the input power for motor operation function, thereof the above said motor and generator functions can be operated independently or simultaneously, thereof if the active power source is an internal engine, a clutch can be further installed between the cylindrical common magnetic pole and the armature connected to the load, whereby when the clutch is closed, the load is driven by the engine directly or the other armature is charged with current simultaneously to constitute a motor and to drive the load with the engine together, or when the engine is reverse driven by the load, the engine constitutes a load side damping, thereof the other functions can be refereed to the afore described F1~F15.

Figure 17:
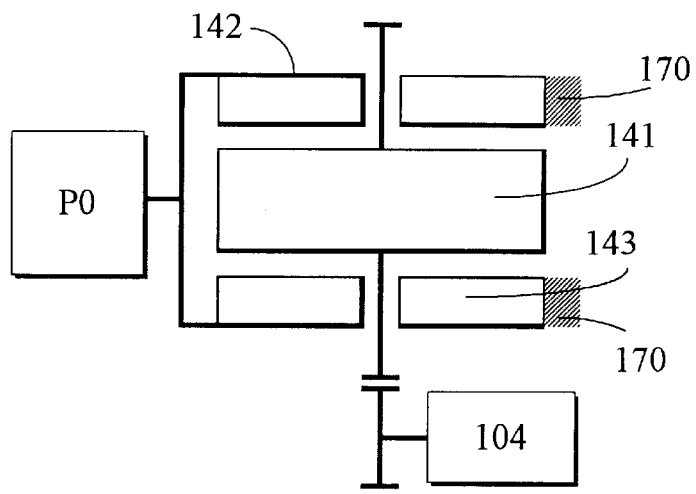
FIG. 17 is the third schematic diagram of the embodying example of the invention illustrating a three-layered electromechanical structure, wherein its outer layer is installed with two coaxial ring shaped armature, while a coaxial cylindrical common magnetic pole is installed at the middle.

FIG. 17 is a schematic diagram of the embodying example of the combined power driven device having a three-layered electromechanical structure with common structures illustrating that the middle cylindrical common magnetic pole is coupled with the load, and two coaxial ring shaped armatures are parallel installed at the outer layer, wherein one of the ring shaped armature is coupled with the active power source P0, while the other ring shaped armature is locking fixed with the casing static structure, wherein it is mainly comprised of the following:

A power source P0 : It is a rotational power source driven by engine or other mechanical power or manpower;

The three-layered electromagnetic structure with common structures 100: The middle cylindrical common magnetic pole 141 and the two coaxial independent outer layer ring shaped armatures 142, 143 are appeared in a three-layered coaxial coupling structure, wherein the middle cylindrical common magnetic pole 141 is coupled with the load 104 directly or through a transmission component and one of the two outer layer ring shaped armatures 142,143 is locking fixed with the casing static structure, while the other armature is coupled with the active power source P0, whereby the three armatures constitute a close magnetic circuit and can be interactively rotated at the same axis, and the mechanical auxiliary interfaces can be selected as required to further install an unidirectional transmission device or a clutch or both of them between the two outer layer ring shaped armatures 142, 143, and the cylindrical common magnetic pole 141 of the afore said three-layered electromechanical structure 100 to set the interactive status between the three armatures, wherein one of the side armatures is controlled by the driving control device to drive the cylindrical common magnetic pole through the reaction force to provide positive/Reverse rotations and load driving varied speed motor functions, or to be driven by the mechanical power to provide generator functions, while the other armature is driven by the active power source P0 to provide a generator operation with its charging current to the battery controlled by the adjuster control device, or it can be driven by the input power for motor operation function, thereof the above said motor and generator functions can be operated independently or simultaneously, thereof if the active power source is an internal engine, a clutch can be further installed between the cylindrical common magnetic pole and the load, whereby when the clutch is closed, the load is driven by the engine directly or the other armature is charged with current simultaneously to constitute a motor and to drive the load with the engine together, or when the engine is reverse driven by the load, the engine constitutes a load side damping, thereof the other functions can be refereed to the afore described F1~F15.

For the combined power driven device having a three-layered electromechanical structure with common structures, besides of that the three-layered electromagnetic structure with common structures 100 can be interactively constituted by a single outer layer armature and a single middle layer common magnetic pole and a single inner layer armature at the same axis, it can also be constituted by the three interactive rotors including a middle layer common magnetic pole and two side coupled inner layer and outer layer armatures in the three-layered electromechanical structure, wherein one or two items of them can be constituted by a multiple form of two or more than two rotors.

Figure 18:
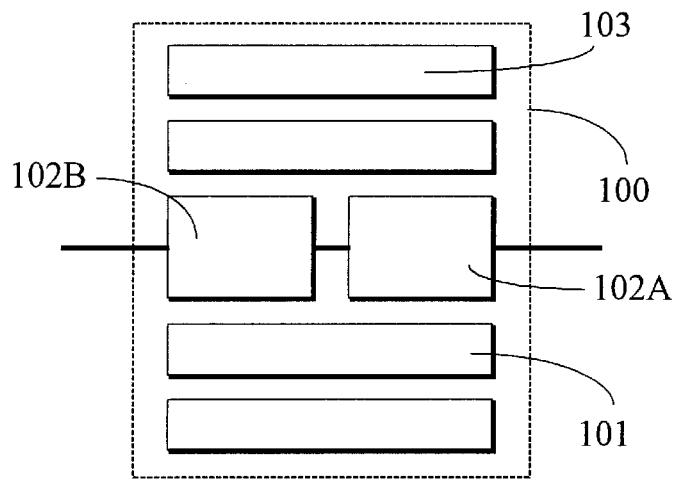
FIG. 18 is the first schematic diagram of the embodying example of the invention illustrating that multiple electromagnetic effect interactive components are installed at the same layer.

FIG. 18 is the first schematic diagram of the embodying example of the combined power driven device having a three-layered electromechanical structure with common structures having multiple electromagnetic effect interactive components, wherein it is comprised of the following:

A three-layered electromagnetic structure with common structures, wherein it is comprised of two inner layer armatures 102A, 102B independently operated or commonly controlled by a clutch or an electrical circuit, and a single middle layer common magnetic pole 101 coupled with the two independent inner layer armatures 102A, 102B, as well as a single outer layer armature 103 coupled with the middle layer common magnetic pole 101 at the other side.

Figure 19:
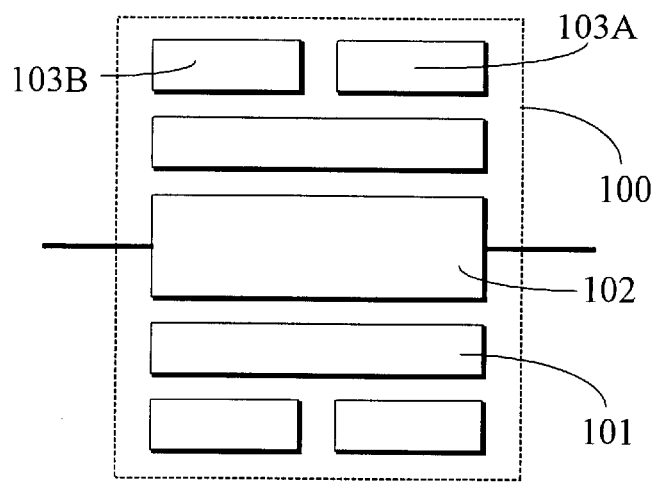
FIG. 19 is the second schematic diagram of the embodying example of the invention illustrating that multiple electromagnetic effect interactive components are installed at the same layer.

FIG. 19 is the second schematic diagram of the embodying example of the combined power driven device having a three-layered electromechanical structure with common structures having multiple electromagnetic effect interactive components, wherein it is comprised of the following:

A three-layered electromagnetic structure with common structures, wherein it is comprised of two outer layer armatures 103A, 103B independently operated or commonly controlled by a clutch or an electrical circuit, and a single middle layer common magnetic pole 101 coupled with the two independent outer layer armatures 103A, 103B, as well as the inner layer armature 102 coupled with the middle layer common magnetic pole 101 at the other side.

Figure 20:
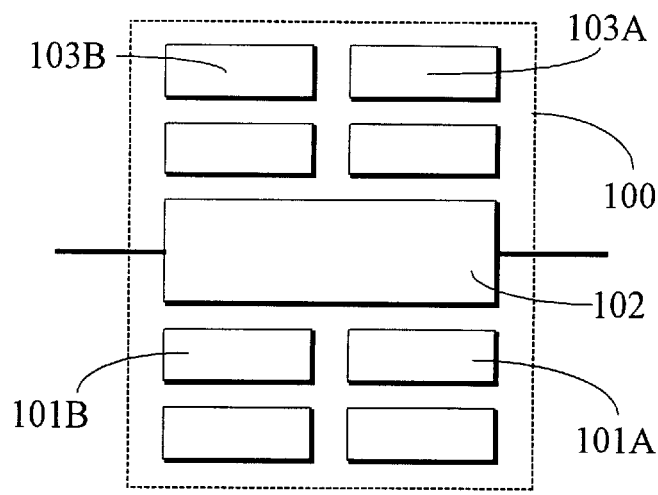
FIG. 20 is the third schematic diagram of the embodying example of the invention illustrating that multiple electromagnetic effect interactive components are installed at the same layer.

FIG. 20 is the third schematic diagram of the embodying example of the combined power driven device having a three-layered electromechanical structure with common structures having multiple electromagnetic effect interactive components, wherein it is comprised of the following:

A three-layered electromagnetic structure with common structures, wherein it is comprised of two outer layer armatures 103A, 103B independently operated or commonly controlled by a clutch or an electrical circuit, and two middle layer common magnetic poles 101A, 101B which can be independently operated or controlled by a clutch or an electrical circuit and are coupled with the two outer layer side armatures as well as a single inner layer armature 102 coupled with the inside of the middle layer common magnetic poles.

Figure 21:
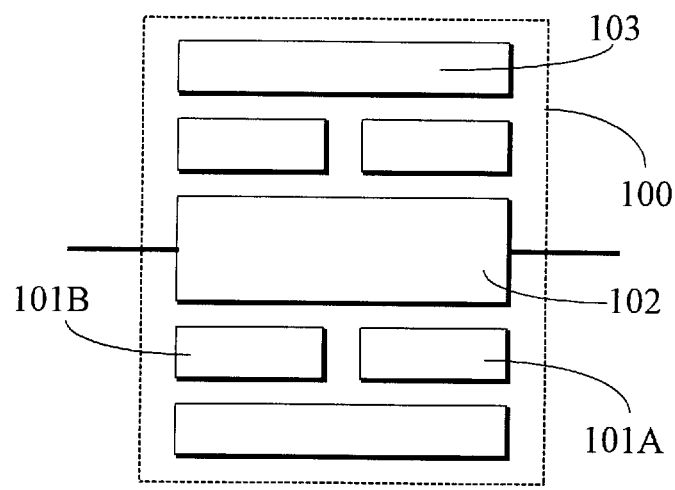
FIG. 21 is the fourth schematic diagram of the embodying example of the invention illustrating that multiple electromagnetic effect interactive components are installed at the same layer.

FIG. 21 is the fourth schematic diagram of the embodying example of the combined power driven device having a three-layered electromechanical structure with common structures having multiple electromagnetic effect interactive components, wherein it is comprised of the following:

A three-layered electromagnetic structure with common structures, wherein it is comprised of a common outer layer armature 103, and two middle layer common magnetic poles 101A, 101B as well as a single inner layer armature 102.

Figure 22:
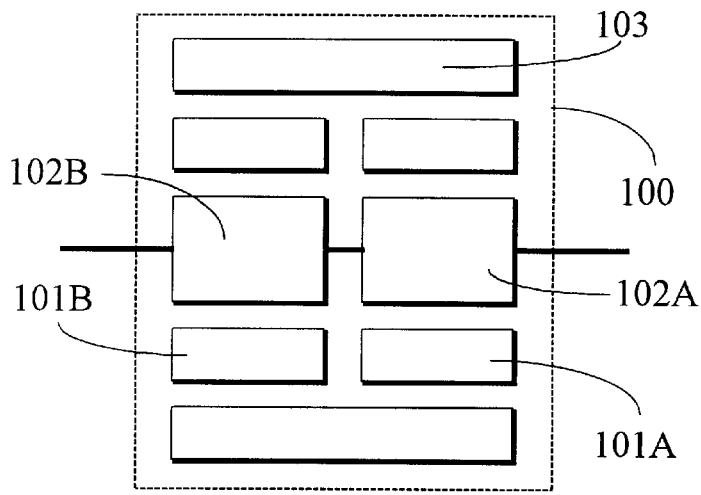
FIG. 22 is the fifth schematic diagram of the embodying example of the invention illustrating that multiple electromagnetic effect interactive components are installed at the same layer.

FIG. 22 is the fifth schematic diagram of the embodying example of the combined power driven device having a three-layered electromechanical structure with common structures having multiple electromagnetic effect interactive components, wherein it is comprised of the following:

A three-layered electromagnetic structure with common structures, wherein it is comprised of a common outer layer armature 103 and two middle layer common magnetic poles 101A, 101B which are independently operated or commonly controlled by a clutch or an electrical circuit, as well as two inner layer armatures 102A, 102B which are independently operated or commonly controlled by a clutch or an electrical circuit and are coupled with the common magnetic pole.

Figure 23:
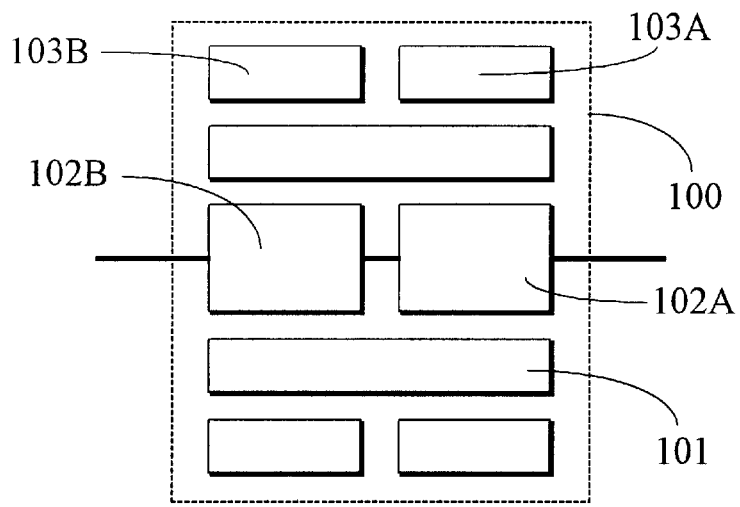
FIG. 23 is the sixth schematic diagram of the embodying example of the invention illustrating that multiple electromagnetic effect interactive components are installed at the same layer.

FIG. 23 is the sixth schematic diagram of the embodying example of the combined power driven device having a three-layered electromechanical structure with common structures having multiple electromagnetic effect interactive components, wherein it is comprised of the following:

A three-layered electromagnetic structure with common structures, wherein it is comprised of two outer layer armatures 103A, 103B which are independently operated or commonly controlled by a clutch or an electrical circuit and a middle layer common magnetic pole 101 as well as two inner layer armatures 102A, 102B which are independently operated or commonly controlled by a clutch or an electrical circuit and are coupled with the common magnetic pole.

The coupling and interactive relationships of the active power source P0 and the casing static structure as well as the load in the above described FIGS. 18~23 can be deduced from single units, wherein besides of the above described multiple number application principle, the number of the electromagnetic effect interactive devices such as the common magnetic poles and the inner, outer layer armatures can be increased according to the requirement to match with the needs for driving loads.

The afore described items are the application examples of the combined power driven device having a three-layered electromechanical structure with common structures, wherein the interactive relationships between the driving torque of active power source P0, and the torque of the armature to the load can be employed to proportionally distribute their interactive torque and to do speed addition/subtraction control through combining with the planetary type differential wheel train, whereof the coupling methods include the following:

The common magnetic pole and two armatures of the three-layered electromagnetic structure with common structures are respectively coupled with the sun wheel of the planetary wheel train, or coupled with the outside ring wheel, or coupled with the input/output shaft driven by the swing arm steered by the planetary wheel train, or coupled with the load, or coupled with the active power source P0, or coupled with the casing static structure; or are through the clutches, unidirectional transmission devices, or brakes to respectively coupled with the planetary wheel train, or coupled with the outside ring wheel, or coupled with the input/output shaft driven by the swing arm steered by the planetary wheel train, or coupled with the load, or coupled with the active power source P0, or coupled with the casing static structure;

The input/output shaft driven by the swing arm steered by the sun wheel, or the outside ring wheel or the planetary wheel of the planetary wheel train is respectively coupled with the load or the coupled with the active power source P0 or coupled with the casing static structure; or is through a clutch or an unidirectional transmission device, or a brake to respectively coupled with the middle layer common magnetic pole or coupled with the two armatures of the three-layered electromagnetic structure with common structures, or coupled with the load, or coupled with the active power source P0, or coupled with the casing static structure.

Through the additional installation of the differential wheel train and the matching principle of the three-layered electromagnetic structure with common structures, the disclosed interactive relationships between the active power source P0 and the load in the afore said embodying examples can be further expanded from the addition/subtraction interaction to proportional torque and speed interaction, i.e. through the above said embodiments, the original torque and speed relationships between the active power source and the load are converted from addition/subtraction to proportional differential driving; thereof the afore said embodying examples of FIGS. 3~11 can be expanded by combining with the differential wheel train, whereby the combined power driven device having a three-layered electromechanical structure with common structures can be further provided with the following:

To proportionally distribute the torque and speed ratio of the inner layer and outer layer armatures or the torque ratio of the active power source P0 combined with the outer layer armature, and to do speed addition/subtraction control, as well as to arrange the input/output shaft driven by the swing arm steered by the planetary wheel, and the sun wheel or rotation shaft driven by the inner layer armature according to requirements and the interactive relationship between the active power source P0 and the outer layer armature.

Figure 24:
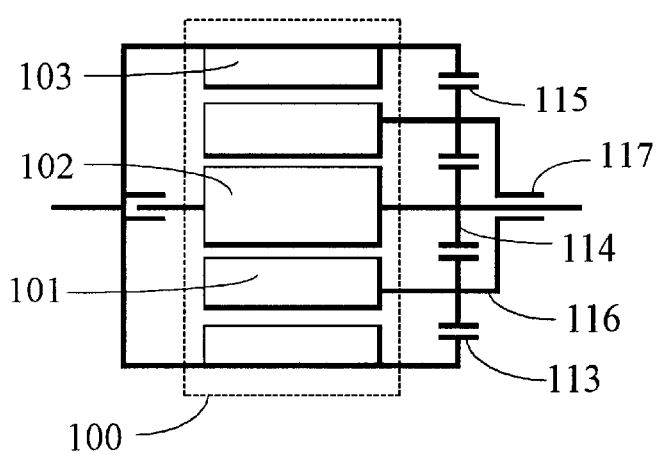
FIG. 24 is the first embodying example of the invention combined with a differential wheel train.
Figures 1, 24:
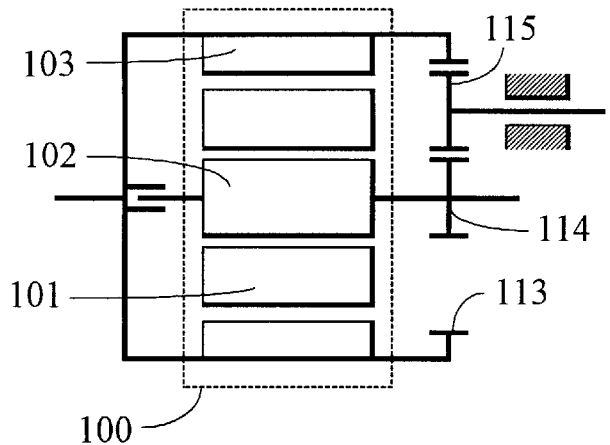

The coupling principles between the outer layer armature, the middle layer common magnetic pole, and the inner layer armature of the three-layered electromagnetic structure with common structures, the active power source P0 and the load, as well as the casing static structure and the differential wheel train include the following:

D1: The outside ring wheel 113: It is driven by the active power source P0 or is coupled with the outer layer armature driven by the active power source P0, or coupled with the middle layer common magnetic pole, or coupled with the inner layer armature, or coupled with the load, or coupled with the casing static structure;

D2: The planetary wheel 115 by which the swing arm 116 is steered to drive the input/output shaft 117: It is driven by the active power source P0 or is coupled with the outer layer armature driven by the active power source P0, or coupled with the middle layer common magnetic pole, or coupled with the inner layer armature, or coupled with the load, or coupled with the casing static structure;

D3: The sun wheel 114: It is driven by the active power source P0 or is coupled with the outer layer armature driven by the active power source P0, or coupled with the middle layer common magnetic pole, or coupled with the inner layer armature, or coupled with the load, or coupled with the casing static structure;

The representative embodying examples in the FIGS. 24~39 are listed below to illustrate the interactive relationships of the combined power driven device having a three-layered electromechanical structure with common structures combined with the differential wheel train, wherein they include the following:

The middle layer common magnetic pole and the two armatures of the three-layered electromechanical structure are respectively coupled with the sun wheel, planetary wheel and outside ring wheel of the differential wheel train;

The middle layer common magnetic pole and the two armatures of the three-layered electromechanical structure are respectively coupled with two of the sun wheel, planetary wheel and outside ring wheel of the differential wheel train, while the one of the differential wheel train which is not coupled with the three-layered electromechanical structure is coupled with the load or the casing static structure, or the active power source. The embodying examples of the interaction of the combined power driven device having a three-layered electromechanical structure with common structures combined with the differential wheel train based on the afore described principles in D1~D3 is as following:

FIG. 24 is the first embodying example of the combined power driven device having a three-layered electromechanical structure with common structures combined with a differential wheel train, wherein it is mainly comprised of the following:

The three-layered electromagnetic structure with common structures 100: The middle cylindrical common magnetic pole 101 and the two independent armatures 102, 103 are appeared in a three-layered coaxial coupling structure, wherein the middle layer common magnetic pole 101 is coupled with the planetary wheel 115 of the differential wheel train by which the swing arm 116 is steered to drive the input/output shaft 117, and the inner layer armature 102 is coupled with the sun wheel 114, while the outer layer armature 103 is coupled with the outside ring wheel 113; whereby the interactive relationships achieved through combining with the differential wheel train can be selected as required to match with the afore said electromechanical auxiliary interface, and the mechanical auxiliary interface, structure interface as well as the various combination arrangements between the middle layer common magnetic pole 101, outer layer armature 103, or inner layer armature 102, or the outside ring wheel 113, or the planetary wheel 115 or the sun wheel 114 of the differential wheel train and the active power source P0 or the load, or the casing static structure can also be selected as required.

FIG. 24-1 is a schematic diagram of the embodying example illustrating that the embodying example of FIG. 24 provides output directly through the planetary wheel with a fixed center of axis, wherein it is comprised of the following:

The input/output is directly achieved through the planetary wheel 115 with fixed center of axis which is in a proportional interactive relationship with the outer layer armature 103 and the inner layer armature 102.

Figure 25:
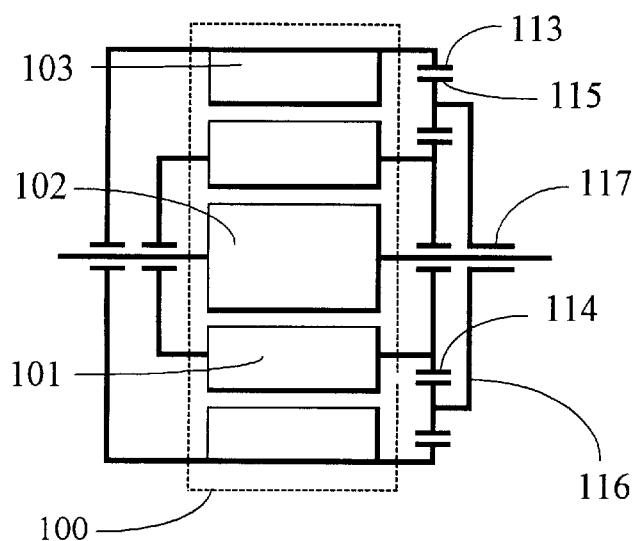
FIG. 25 is the second embodying example of the invention combined with a differential wheel train.
Figures 1, 25:
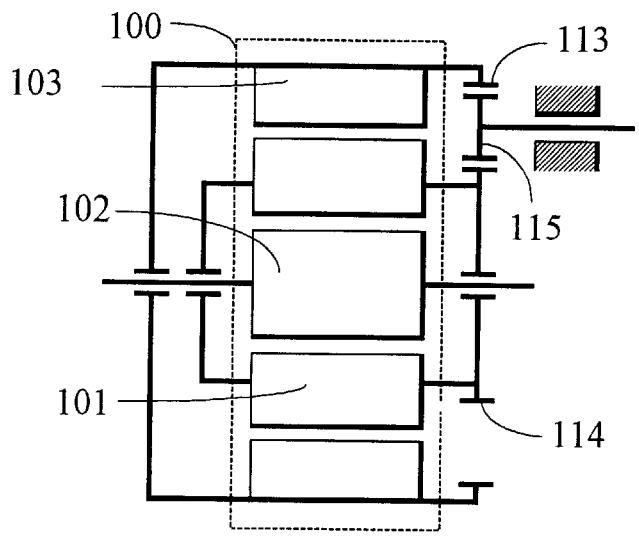

FIG. 25 is the second embodying example of the combined power driven device having a three-layered electromechanical structure with common structures combined with a differential wheel train, wherein it is comprised of the following:

The three-layered electromagnetic structure with common structures 100: The middle cylindrical common magnetic pole 101 and the two independent armatures 102, 103 are appeared in a three-layered coaxial coupling structure, wherein the middle layer common magnetic pole 101 is coupled with the sun wheel 114 of the differential wheel train, and the outer layer armature 103 is coupled with the outside ring wheel 113 of the differential wheel train, while the inner layer armature 102 and the output shaft 117 driven by, the swing arm 116 steered by the planetary wheel 115 of the planetary wheel train are at independent operation status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the middle layer common magnetic pole 101, outer layer armature 103, or inner layer armature 102, or the outside ring wheel 113, or the planetary wheel 115 or the sun wheel 114 of the differential wheel train and the active power source P0 or the load, or the casing static structure can also be selected as required.

FIG. 25-1 is a schematic diagram of the embodying example illustrating that the embodying example of FIG. 25 provides output directly through the planetary wheel with a fixed center of axis, wherein it is mainly comprised of the following:

The input/output is directly achieved through the planetary wheel 115 with fixed center of axis which is in a proportional interactive relationship with the outer layer armature 103 and the middle layer common magnetic pole 101.

Figure 26:
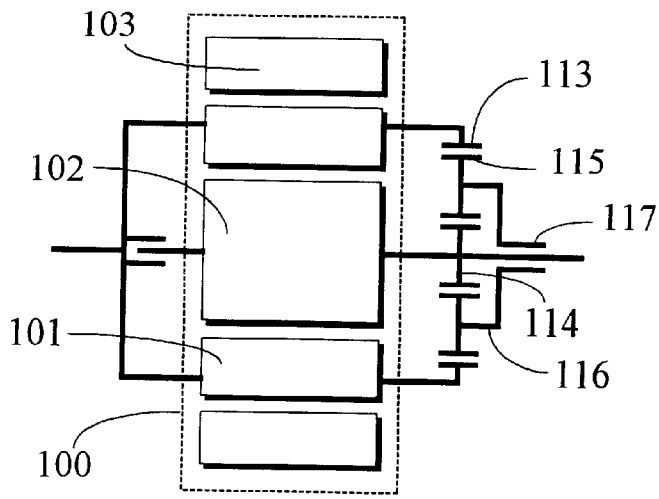
FIG. 26 is the third embodying example of the invention combined with a differential wheel train.
Figures 1, 26:
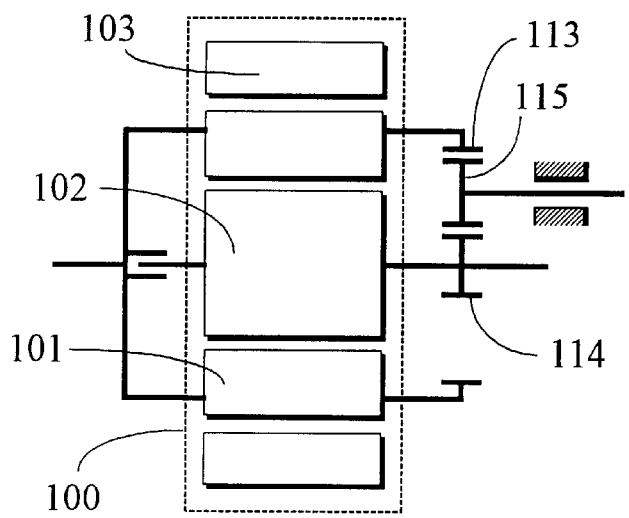

FIG. 26 is the third embodying example of the invention combined with a differential wheel train, wherein it is mainly comprised of the following:

The three-layered electromagnetic structure with common structures 100: The middle cylindrical common magnetic pole 101 and the two independent armatures 102, 103 are appeared in a three-layered coaxial coupling structure, wherein the middle layer common magnetic pole 101 is coupled with the outside ring wheel 113 of the differential wheel train, and the inner layer armature 102 is coupled with the sun wheel 114 of the differential wheel train, while the outer layer armature 103 and the output shaft 117 driven by the swing arm 116 steered by the planetary wheel 115 of the planetary wheel train are at independent operation status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the middle layer common magnetic pole 101, outer layer armature 103, or inner layer armature 102, or the outside ring wheel 113, or the planetary wheel 115 or the sun wheel 114 of the differential wheel train and the active power source P0 or the load, or the casing static structure can also be selected as required.

FIG. 26-1 is a schematic diagram of the embodying example illustrating that the embodying example of FIG. 26 provides output directly through the planetary wheel with a fixed center of axis, wherein it is mainly comprised of the following:

The input/output is directly achieved through the planetary wheel 115 with fixed center of axis which is in a proportional interactive relationship with the inner layer armature 102 and the middle layer common magnetic pole 101.

Figure 27:
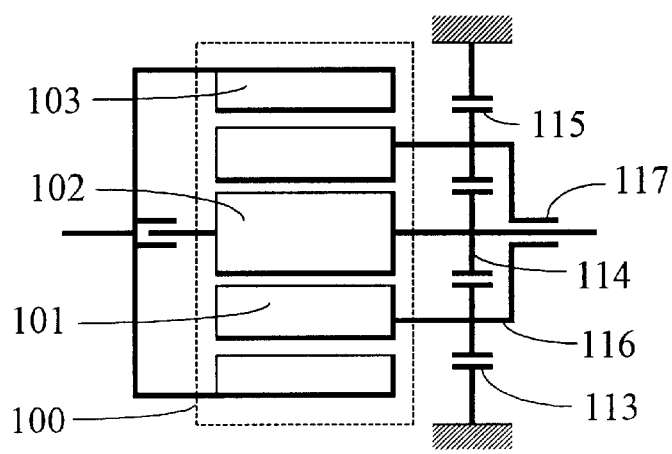
FIG. 27 is the fourth embodying example of the invention combined with a differential wheel train.
Figures 1, 27:
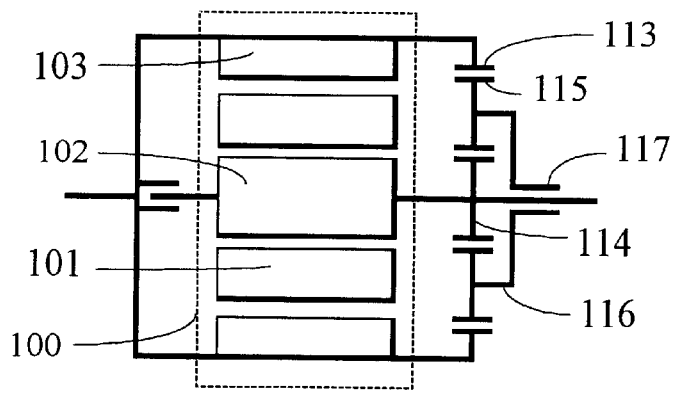

FIG. 27 is the fourth embodying example of the combined power driven device having a three-layered electromechanical structure with common structures combined with a differential wheel train, wherein it is mainly comprised of the following:

The three-layered electromagnetic structure with common structures 100: The middle cylindrical common magnetic pole 101 and the two independent armatures 102, 103 are appeared in a three-layered coaxial coupling structure, wherein the middle layer common magnetic pole 101 is coupled with the planetary wheel 115 of the differential wheel train by which the swing arm 116 is steered to drive the input/output shaft 117, and the inner layer armature 102 is coupled with the sun wheel 114, while the outer layer armature 103 is operated independently and the outside ring wheel 113 of the planetary wheel train is also operated independently, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the middle layer common magnetic pole 101, outer layer armature 103, or inner layer armature 102, or the outside ring wheel 113, or the planetary wheel 115 or the sun wheel 114 of the differential wheel train and the active power source P0 or the load, or the casing static structure can also be selected as required.

FIG. 27-1 is a schematic diagram of the embodying example illustrating that the embodying example of FIG. 27 is modified to let the middle layer common structure be a free rotor, wherein it is mainly comprised of the following:

The three-layered electromagnetic structure with common structures 100: The middle cylindrical common magnetic pole 101 and the two independent armatures 102, 103 are appeared in a three-layered coaxial coupling structure, wherein the middle layer common magnetic pole 101 is independently operated through the electromagnetic effect with the two armatures, the input/output shaft 117 is driven by the swing arm 116 steered by the planetary wheel, and the inner layer armature 102 is coupled with the sun wheel 114, while the outer layer armature 103 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the middle layer common magnetic pole 101, outer layer armature 103, or inner layer armature 102, or the outside ring wheel 113, or the planetary wheel 115 or the sun wheel 114 of the differential wheel train and the active power source P0 or the load, or the casing static structure can also be selected as required.

Figure 28:
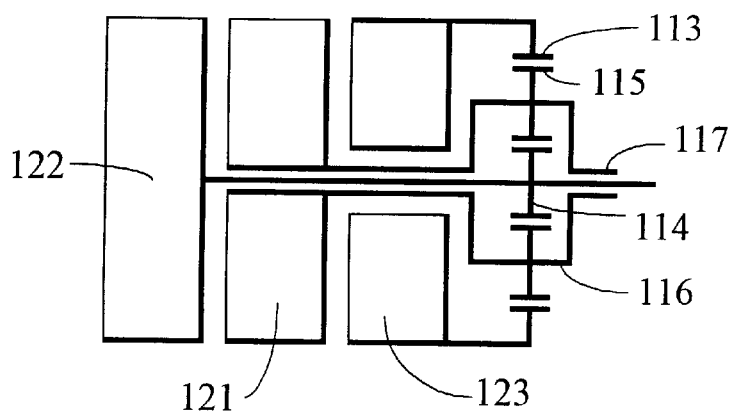
FIG. 28 is the fifth embodying example of the invention combined with a differential wheel train.
Figures 1, 28:
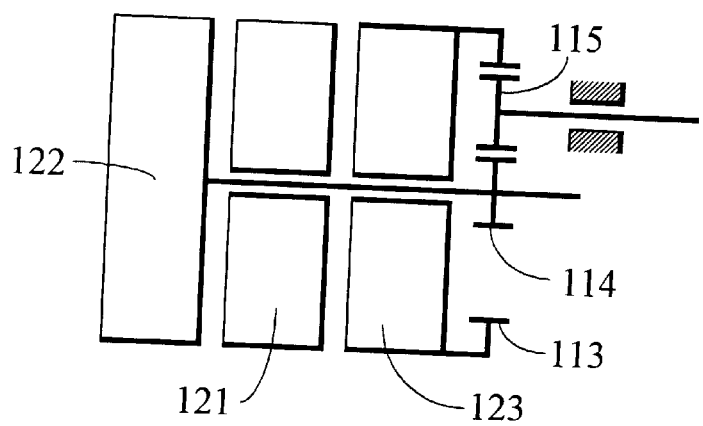

FIG. 28 is the fifth embodying example of the combined power driven device having a three-layered electromechanical structure with common structures combined with a differential wheel train, wherein it is mainly comprised of the following:

The three-layered electromagnetic structure with common structures 100: The middle layer disk (or cone) shaped common magnetic pole 121 and the two independent armatures 122, 123 arranged in a row are appeared in a coaxial coupling structure, wherein the middle layer common magnetic pole 121 is coupled with the planetary wheel 115 of the differential wheel train by which the swing arm 116 is steered to drive the input/output shaft 117, and the disk shaped armature 122 is coupled with the sun wheel 114, while the other armature 123 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the middle layer disk (or cone) shaped common magnetic pole 121, the outer layer disk shaped armature 123, or the other armature 122, or the outside ring wheel 113, or the planetary wheel 115 or the sun wheel 114 of the differential wheel train and the active power source P0 or the load, or the casing static structure can also be selected as required.

FIG. 28-1 is a schematic diagram of the embodying example illustrating that the embodying example of FIG. 28 provides output directly through the planetary wheel with a fixed center of axis, wherein it is mainly comprised of the following:

The input/output is directly achieved through the planetary wheel 115 with fixed center of axis which is in a proportional interactive relationship with the disk shaped armature 122 and the disk shaped armature 123.

Figure 29:
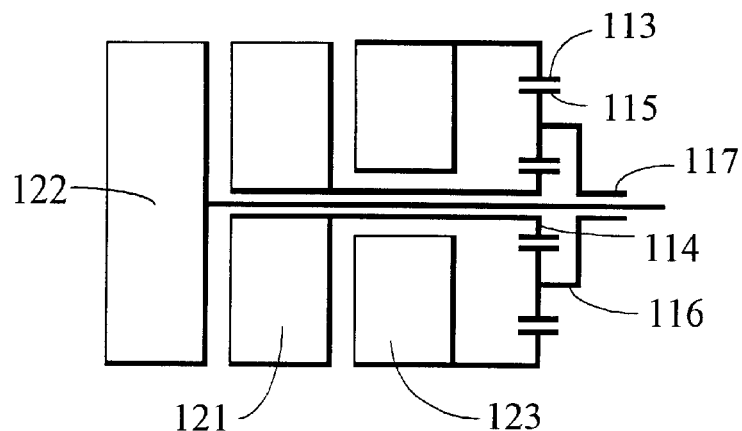
FIG. 29 is the sixth embodying example of the invention combined with a differential wheel train.
Figures 1, 29:
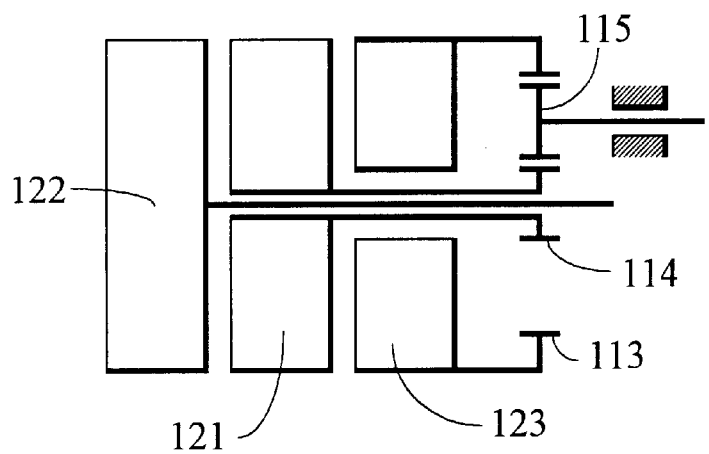

FIG. 29 is the sixth embodying example of the combined power driven device having a three-layered electromechanical structure with common structures combined with a differential wheel train, wherein it is mainly comprised of the following:

The three-layered electromagnetic structure with common structures 100: The middle layer disk (or cone) shaped common magnetic pole 121 and the two independent armatures 122, 123 arranged in a row are appeared in a coaxial coupling structure, wherein the middle layer common magnetic pole 121 is coupled with the sun wheel 114 of the differential wheel train, and the disk shaped armature 123 is coupled with the outside ring wheel 113 of the differential wheel train, while the other armature 122 and the input/output shaft 117 driven by the swing arm 116 steered by the planetary wheel 115 of the planetary wheel train are at independent operation status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the middle layer disk (or cone) shaped common magnetic pole 121, the disk shaped armature 123, or the other disk shaped armature 122, or the outside ring wheel 113, or the planetary wheel 115 or the sun wheel 114 of the differential wheel train and the active power source P0 or the load, or the casing static structure can also be selected as required.

FIG. 29-1 is a schematic diagram of the embodying example illustrating that the embodying example of FIG. 29 provides output directly through the planetary wheel with a fixed center of axis, wherein it is mainly comprised of the following:

The input/output is directly achieved through the planetary wheel 115 with fixed center of axis which is in a proportional interactive relationship with the disk shaped armature 123 and the middle layer disk shaped common magnetic pole 121.

Figure 30:
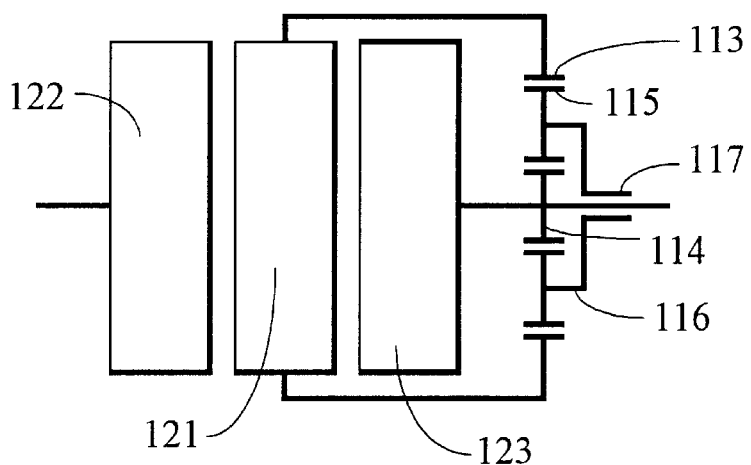
FIG. 30 is the seventh embodying example of the invention combined with a differential wheel train.
Figures 1, 30:
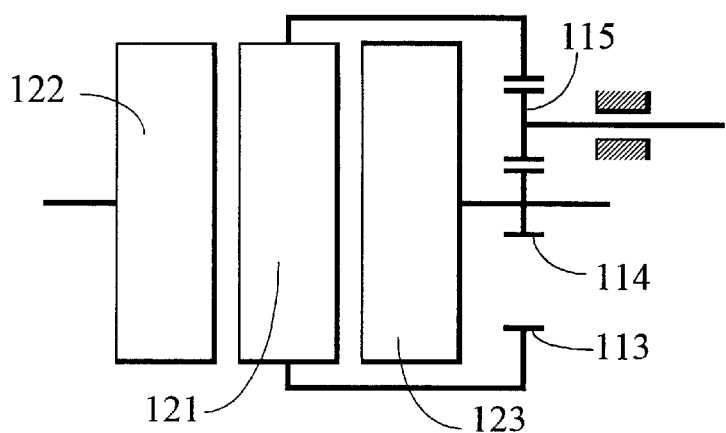

FIG. 30 is the seventh embodying example of the combined power driven device having a three-layered electromechanical structure with common structures combined with a differential wheel train, wherein it is mainly comprised of the following:

The three-layered electromagnetic structure with common structures 100: The middle layer disk (or cone) shaped common magnetic pole 121 and the two independent armatures 122, 123 arranged in a row are appeared in a coaxial coupling structure, wherein the middle layer common magnetic pole 121 is coupled with the outside ring wheel 113 of the differential wheel train, and the disk shaped armature 123 is coupled with the sun wheel 114 of the differential wheel train, while the other armature 122 and the input/output shaft 117 driven by the swing arm 116 steered by the planetary wheel 115 of the planetary wheel train are at independent operation status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the middle layer disk (or cone) shaped common magnetic pole 121, the disk shaped armature 122, or the other disk shaped armature 123, or the outside ring wheel 113, or the planetary wheel 115 or the sun wheel 114 of the differential wheel train and the active power source P0 or the load, or the casing static structure can also be selected as required.

FIG. 30-1 is a schematic diagram of the embodying example illustrating that the embodying example of FIG. 30 provides output directly through the planetary wheel with a fixed center of axis, wherein it is mainly comprised of the following:

The input/output is directly achieved through the planetary wheel 115 with fixed center of axis which is in a proportional interactive relationship with the disk shaped armature 123 and the middle layer disk shaped common magnetic pole 121.

Figure 31:
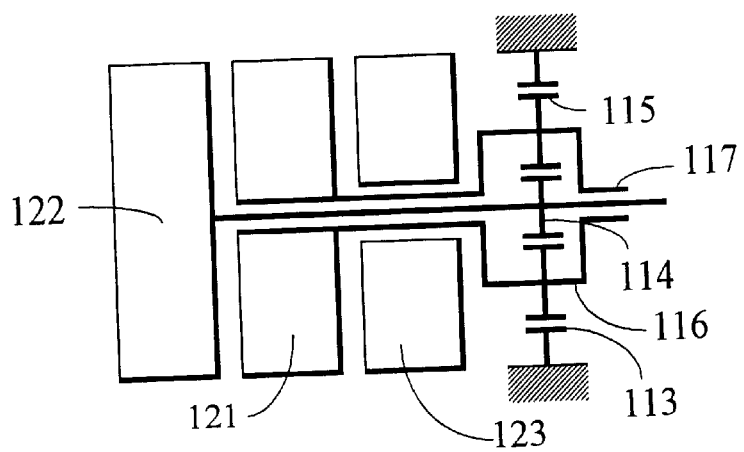
FIG. 31 is the eighth embodying example of the invention combined with a differential wheel train.
Figures 1, 31:
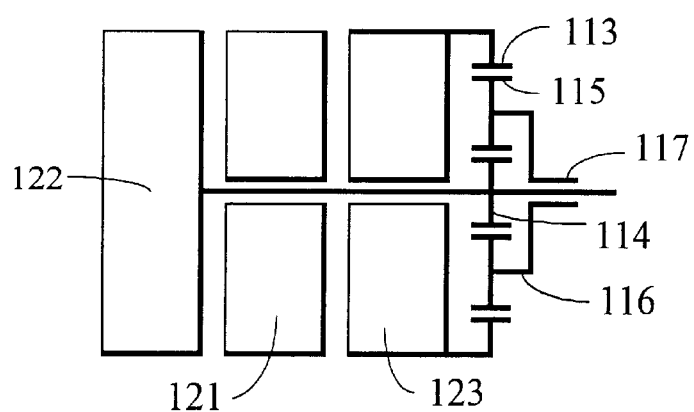

FIG. 31 is the eighth embodying example of the combined power driven device having a three-layered electromechanical structure with common structures combined with a differential wheel train, wherein it is mainly comprised of the following:

The three-layered electromagnetic structure with common structures 100: The middle layer disk (or cone) shaped common magnetic pole 121 and the two independent armatures 122, 123 arranged in a row are appeared in a coaxial coupling structure, wherein the middle layer common magnetic pole 121 is coupled with the planetary wheel 115 of the differential wheel train by which the swing arm 116 is steered to drive the input/output shaft 117, and the disk shaped armature 122 is coupled with the sun wheel 114, while the other armature 123 is operated independently and the outside ring wheel 113 of the planetary wheel is also operated independently, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the middle layer disk (or cone) shaped common magnetic pole 121, the disk shaped armature 123, or the other disk shaped armature 122, or the outside ring wheel 113, or the planetary wheel 115 or the sun wheel 114 of the differential wheel train and the active power source P0 or the load, or the casing static structure can also be selected as required.

FIG. 31-1 is a schematic diagram of the embodying example illustrating that the embodying example of FIG. 31 is modified to let the middle layer common structure be a free rotor, wherein it is mainly comprised of the following:

The three-layered electromagnetic structure with common structures 100: The middle layer disk (or cone) shaped common magnetic pole 121 and the two independent armatures 122, 123 arranged in a row are appeared in a coaxial coupling structure, wherein the middle layer common magnetic pole 121 is independently operated through the electromagnetic effect with the two disk shaped armatures and the input/output shaft 117 is driven by the swing arm 116 steered by the planetary wheel 115, while the disk shaped armature 122 is coupled with the sun wheel 114, and the other armature 123 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the middle layer disk (or cone) shaped common magnetic pole 121, the outer layer disk shaped armature 123, or the other disk shaped armature 122, or the outside ring wheel 113, or the planetary wheel 115 or the sun wheel 114 of the differential wheel train and the active power source P0 or the load, or the casing static structure can also be selected as required.

Figure 32:
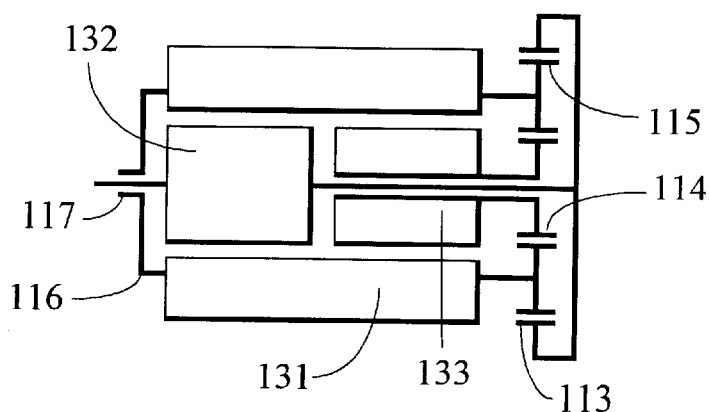
FIG. 32 is the ninth embodying example of the invention combined with a differential wheel train.
Figures 1, 32:
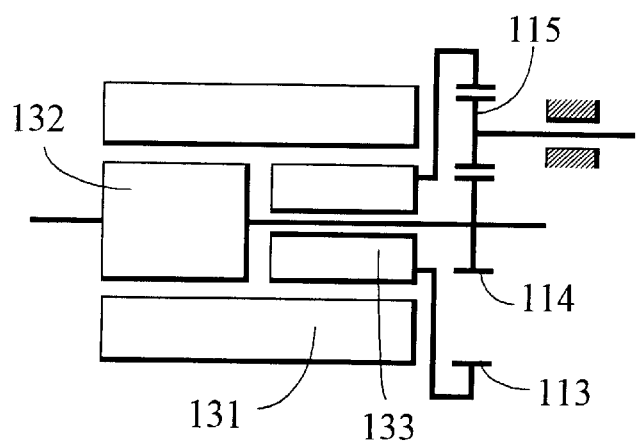

FIG. 32 is the ninth embodying example of the combined power driven device having a three-layered electromechanical structure with common structures combined with a differential wheel train, wherein it is mainly comprised of the following:

The three-layered electromagnetic structure with common structures 100: The outer layer ring shaped common magnetic pole 131 and the two independent cylindrical armatures 132, 133 arranged in a row are appeared in a three-layered coaxial coupling structure, wherein the outer layer ring shaped common magnetic pole 131 is coupled with the planetary wheel 115 of the planetary wheel train by which the swing arm 116 is steered to drive input/output shaft 117, while the inner layer cylindrical armature 133 is coupled with the sun wheel 114, and the other armature 132 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the outer layer ring shaped common magnetic pole 131, the inner layer cylindrical armature 132, or the other inner layer cylindrical armature 133, or the outside ring wheel 113, or the planetary wheel 115 or the sun wheel 114 of the differential wheel train and the active power source P0 or the load, or the casing static structure can also be selected as required.

FIG. 32-1 is a schematic diagram of the embodying example illustrating that the embodying example of FIG. 32 provides output directly through the planetary wheel with a fixed center of axis, wherein it is mainly comprised of the following:

The input/output is directly achieved through the planetary wheel 115 with fixed center of axis which is in a proportional interactive relationship with the cylindrical armature 133 and the ring shaped common magnetic pole 131.

Figure 33:
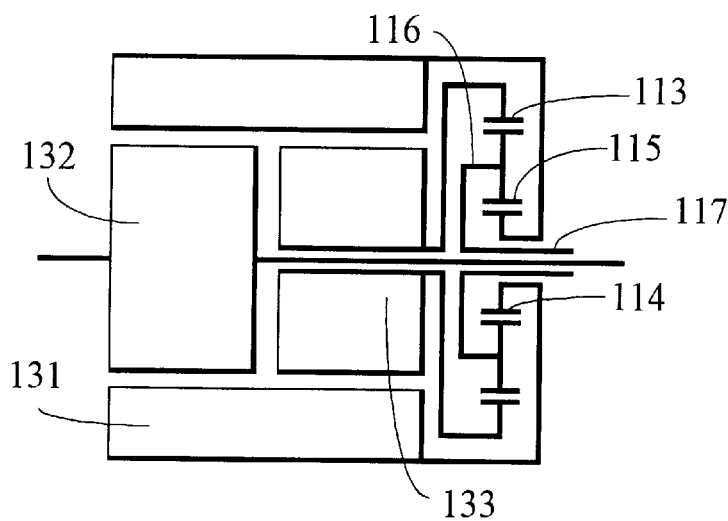
FIG. 33 is the tenth embodying example of the invention combined with a differential wheel train.
Figures 1, 33:
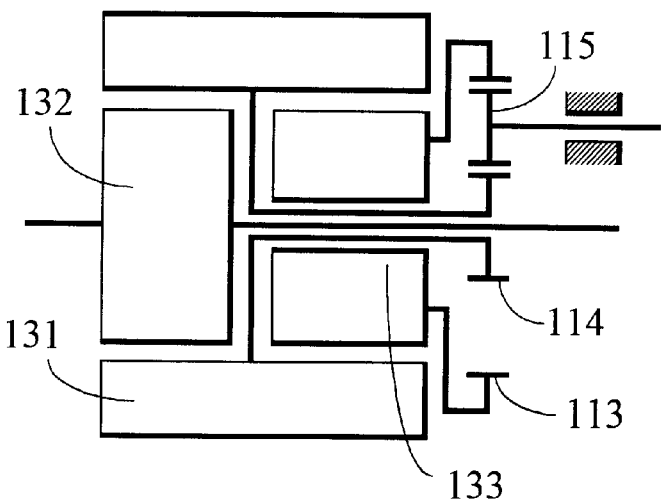

FIG. 33 is the tenth embodying example of the combined power driven device having a three-layered electromechanical structure with common structures combined with a differential wheel train, wherein it is mainly comprised of the following:

The three-layered electromagnetic structure with common structures 100: The outer layer ring shaped common magnetic pole 131 and the two independent inner layer cylindrical armatures 132, 133 arranged in a row are appeared in a three-layered coaxial coupling structure, wherein the outer layer ring shaped common magnetic pole 131 is coupled with the sun wheel 114, and the inner layer cylindrical armature 133 is coupled with the outside ring wheel 113, while the inner layer cylindrical armature 132 and the input/output shaft 117 driven by the swing arm 116 steered by the planetary wheel 115 are at independent operation status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the outer layer ring shaped common magnetic pole 131, the inner layer cylindrical armature 133, or the other inner layer cylindrical armature 132, or the outside ring wheel 113, or the planetary wheel 115 or the sun wheel 114 of the differential wheel train and the active power source P0 or the load, or the casing static structure can also be selected as required.

FIG. 33-1 is a schematic diagram of the embodying example illustrating that the embodying example of FIG. 33 provides output directly through the planetary wheel with a fixed center of axis, wherein it is mainly comprised of the following:

The input/output is directly achieved through the planetary wheel 115 with fixed center of axis which is in a proportional interactive relationship with the cylindrical armature 133 and the ring shaped common magnetic pole 131.

Figure 34:
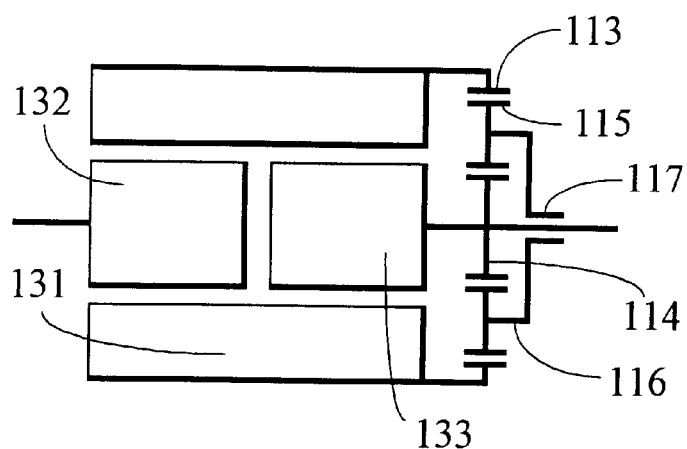
FIG. 34 is the eleventh embodying example of the invention combined with a differential wheel train.
Figures 1, 34:
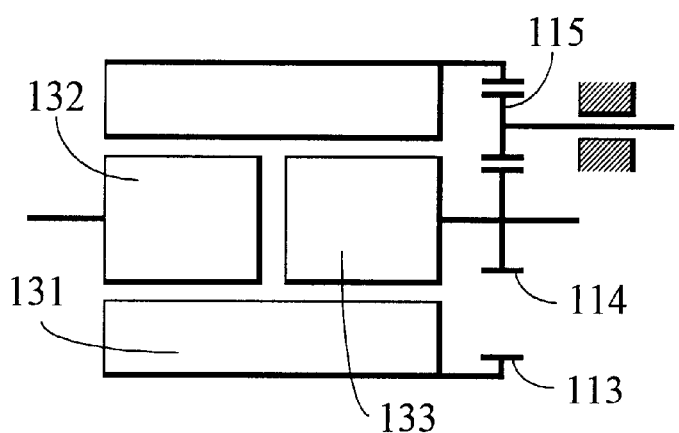

FIG. 34 is the eleventh embodying example of the combined power driven device having a three-layered electromechanical structure with common structures combined with a differential wheel train, wherein it is comprised of the following:

The three-layered electromagnetic structure with common structures 100: The outer layer ring shaped common magnetic pole 131 and the two independent inner layer cylindrical armatures 132, 133 arranged in a row are appeared in a three-layered coaxial coupling structure, wherein the outer layer ring shaped common magnetic pole 131 is coupled with the outside ring wheel 113 of the differential wheel train, and the inner layer cylindrical armature 133 is coupled with the sun wheel 114 of the differential wheel train, while the inner layer cylindrical armature 132 and the input/output shaft 117 driven by the swing arm 116 steered by the planetary wheel 115 are at independent operation status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the outer layer ring shaped common magnetic pole 131, the inner layer cylindrical armature 133, or the other inner layer cylindrical armature 132, or the outside ring wheel 113, or the planetary wheel 115 or the sun wheel 114 of the differential wheel train and the active power source P0 or the load, or the casing static structure can also be selected as required.

FIG. 34-1 is a schematic diagram of the embodying example illustrating that the embodying example of FIG. 34 provides output directly through the planetary wheel with a fixed center of axis, wherein it is mainly comprised of the following:

The input/output is directly achieved through the planetary wheel 115 with fixed center of axis which is in a proportional interactive relationship with the cylindrical armature 133 and the ring shaped common magnetic pole 131.

Figure 35:
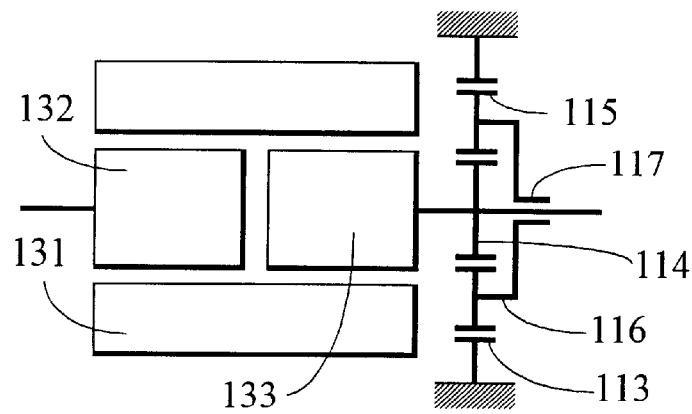
FIG. 35 is the twelfth embodying example of the invention combined with a differential wheel train.
Figures 1, 35:
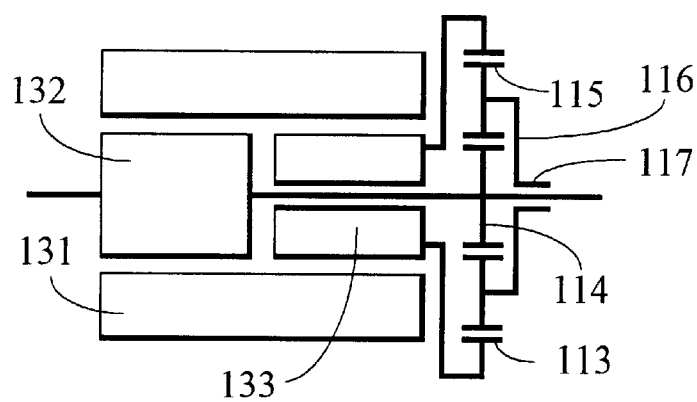

FIG. 35 is the twelfth embodying example of the combined power driven device having a three-layered electromechanical structure with common structures combined with a differential wheel train, wherein it is mainly comprised of the following:

The three-layered electromagnetic structure with common structures 100: The outer layer ring shaped common magnetic pole 131 and the two independent inner layer cylindrical armatures 132, 133 arranged in a row are appeared in a three-layered coaxial coupling structure, wherein the outer layer ring shaped common magnetic pole 131 is coupled with the planetary wheel 115 of the differential wheel train by which the swing arm 116 is steered to drive the input/output shaft 117, and the inner layer cylindrical armature 132 is operated independently, while the outside ring wheel 113 is also operated independently, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the outer layer ring shaped common magnetic pole 131, the inner layer cylindrical armature 132, or the other inner layer cylindrical armature 133, or the outside ring wheel 113, or the planetary wheel 115 or the sun wheel 114 of the differential wheel train and the active power source P0 or the load, or the casing static structure can also be selected as required.

FIG. 35-1 is a schematic diagram of the embodying example illustrating that the embodying example of FIG. 35 is modified to let the middle layer common structure be a free rotor, wherein it is mainly comprised of the following:

The three-layered electromagnetic structure with common structures 100: The outer layer ring shaped common magnetic pole 131 and the two independent inner layer cylindrical armatures 132, 133 arranged in a row are appeared in a three-layered coaxial coupling structure, wherein the outer layer ring shaped common magnetic pole 131 is operated independently through the electromagnetic effect with the two cylindrical armatures and is through the planetary wheel 115 to steer the swing arm 116 to drive the input/output shaft 17, and the inner layer cylindrical armature 132 is coupled with the sun wheel 114, while the inner layer cylindrical armature 133 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the outer layer ring shaped common magnetic pole 131, the inner layer cylindrical armature 132, or the other inner layer cylindrical armature 133, or the outside ring wheel 113, or the planetary wheel 115 or the sun wheel 114 of the differential wheel train and the active power source P0 or the load, or the casing static structure can also be selected as required.

Figure 36:
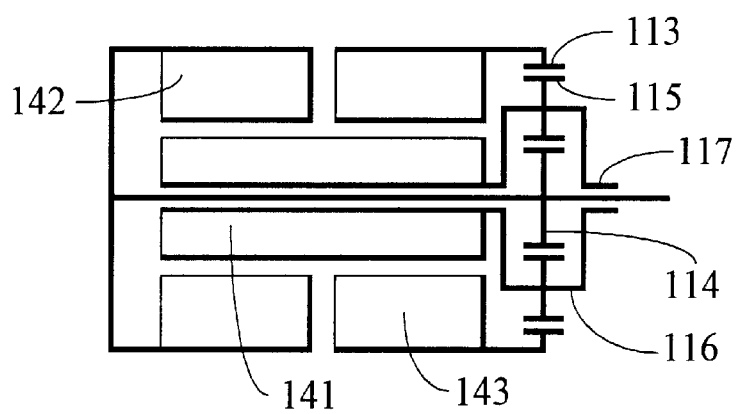
FIG. 36 is the thirteenth embodying example of the invention combined with a differential wheel train.
Figures 1, 36:
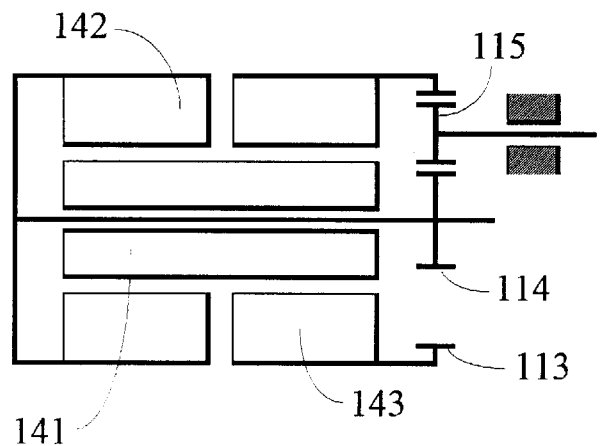

FIG. 36 is the thirteenth embodying example of the combined power driven device having a three-layered electromechanical structure with common structures combined with a differential wheel train, wherein it is mainly comprised of the following:

The three-layered electromagnetic structure with common structures 100: The inner layer cylindrical common magnetic pole 141 and the two independent outer layer ring shaped armatures 142, 143 arranged in a row are appeared in a three-layered coaxial coupling structure, wherein the inner layer cylindrical common magnetic pole 141 is coupled with the planetary wheel 115 of the differential wheel train by which the swing arm 116 is steered to drive the input/output shaft 117, and the outer layer ring shaped armature 142 is coupled with the sun wheel 114, while the outer layer ring shaped armature 143 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the inner layer cylindrical common magnetic pole 141, the outer layer ring shaped armature 143, or the outer layer cylindrical armature 142, or the outside ring wheel 113, or the planetary wheel 115 or the sun wheel 114 of the differential wheel train and the active power source P0 or the load, or the casing static structure can also be selected as required.

FIG. 36-1 is a schematic diagram of the embodying example illustrating that the embodying example of FIG. 36 provides output directly through the planetary wheel with a fixed center of axis, wherein it is mainly comprised of the following:

The input/output is directly achieved through the planetary wheel 115 with fixed center of axis which is in a proportional interactive relationship with the ring shaped armature 142 and the ring shaped armature 143.

Figure 37:
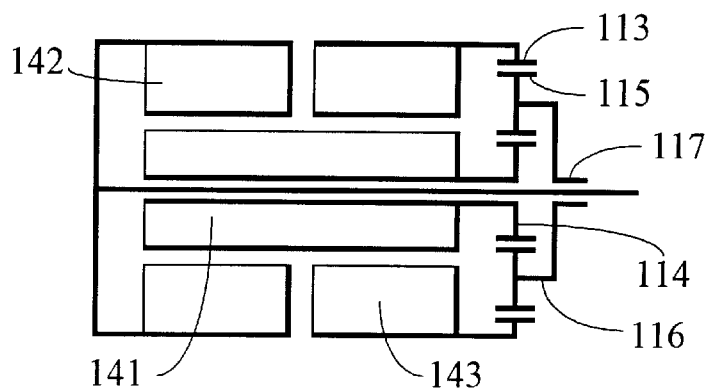
FIG. 37 is the fourteenth embodying example of the invention combined with a differential wheel train.
Figures 1, 37:
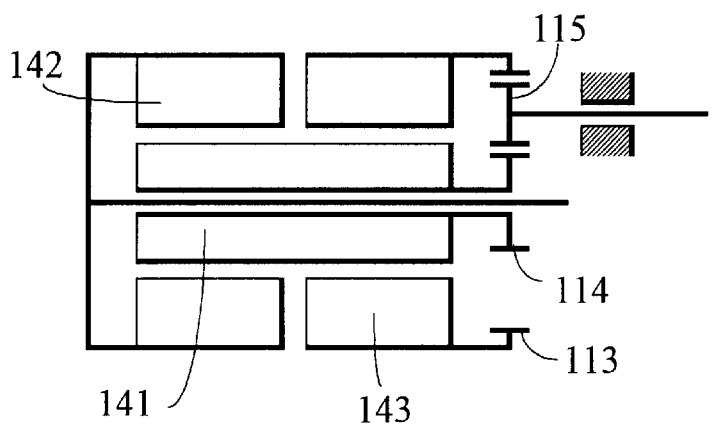

FIG. 37 is the fourteenth embodying example of the combined power driven device having a three-layered electromechanical structure with common structures combined with a differential wheel train.

The three-layered electromagnetic structure with common structures 100: The inner layer cylindrical common magnetic pole 141 and the two independent outer layer ring shaped armatures 142, 143 arranged in a row are appeared in a three-layered coaxial coupling structure, wherein the inner layer cylindrical common magnetic pole 141 is coupled with the sun wheel 114 of the differential wheel train, and the outer layer ring shaped armature 143 is coupled with the outside ring wheel 113 of the differential wheel train, while the outer layer ring shaped armature 142 and the input/output shaft 117 driven by the swing arm 116 steered by the planetary wheel 115 are at independent status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the inner layer cylindrical common magnetic pole 141, the outer layer ring shaped armature 143, or the outer layer cylindrical armature 142, or the outside ring wheel 113, or the planetary wheel 115 or the sun wheel 114 of the differential wheel train and the active power source P0 or the load, or the casing static structure can also be selected as required.

FIG. 37-1 is a schematic diagram of the embodying example illustrating that the embodying example of FIG. 37 provides output directly through the planetary wheel with a fixed center of axis, wherein it is mainly comprised of the following:

The input/output is directly achieved through the planetary wheel 115 with fixed center of axis which is in a proportional interactive relationship with the ring shaped armature 143 and the cylindrical common magnetic pole 141.

Figure 38:
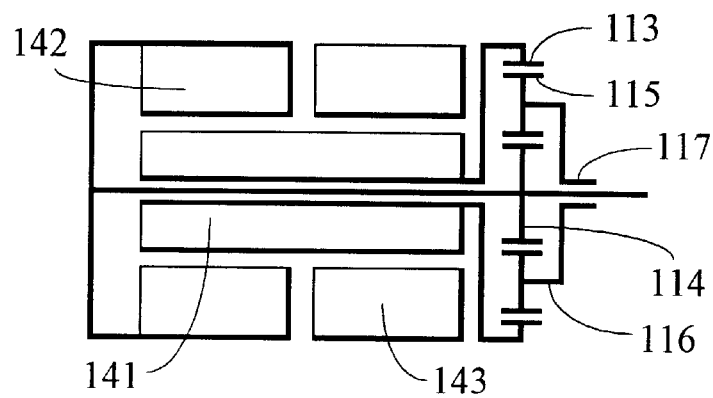
FIG. 38 is the fifteenth embodying example of the invention combined with a differential wheel train.
Figures 1, 38:
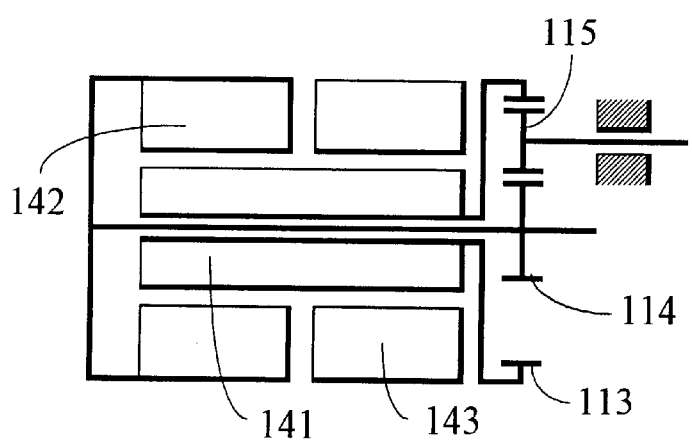

FIG. 38 is the fifteenth embodying example of the combined power driven device having a three-layered electromechanical structure with common structures combined with a differential wheel train, wherein it is mainly comprised of the following:

The three-layered electromagnetic structure with common structures 100: The inner layer cylindrical common magnetic pole 141 and the two independent outer layer ring shaped armatures 142, 143 arranged in a row are appeared in a three-layered coaxial coupling structure, wherein the inner layer cylindrical common magnetic pole 141 is coupled with the outside ring wheel 113 of the differential wheel train, and the outer layer ring shaped armature 142 is coupled with the sun wheel 114 of the differential wheel train, while the outer layer ring shaped armature 143 and the input/output shaft 117 driven by the swing arm 116 steered by the planetary wheel 115 are at independent status, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the inner layer cylindrical common magnetic pole 141, the outer layer ring shaped armature 143, or the outer layer cylindrical armature 142, or the outside ring wheel 113, or the planetary wheel 115 or the sun wheel 114 of the differential wheel train and the active power source P0 or the load, or the casing static structure can also be selected as required.

FIG. 38-1 is a schematic diagram of the embodying example illustrating that the embodying example of FIG. 38 provides output directly through the planetary wheel with a fixed center of axis, wherein it is mainly comprised of the following:

The input/output is directly achieved through the planetary wheel 115 with fixed center of axis which is in a proportional interactive relationship with the ring shaped armature 142 and the cylindrical common magnetic pole 141.

Figure 39:
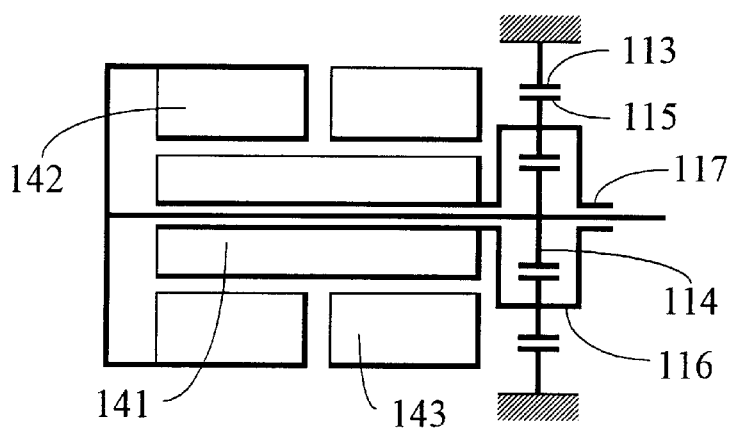
FIG. 39 is the sixteenth embodying example of the invention combined with a differential wheel train.
Figures 1, 39:
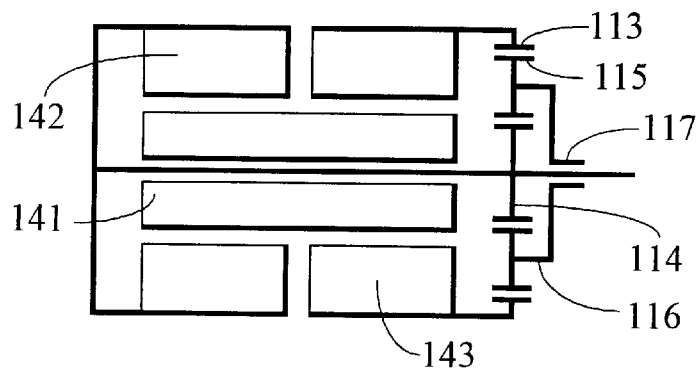

FIG. 39 is the sixteenth embodying example of the invention combined with a differential wheel train.

The three-layered electromagnetic structure with common structures 100: The inner layer cylindrical common magnetic pole 141 and the two independent outer layer ring shaped armatures 142, 143 arranged in a row are appeared in a three-layered coaxial coupling structure, wherein the inner layer cylindrical common magnetic pole 141 is coupled with the planetary wheel 115 of the differential wheel train by which the swing arm 116 is steered to drive the input/output shaft 117, and the outer layer ring shaped armature 142 is coupled with the sun wheel 114, while the outer layer ring shaped armature 143 is operated independently, and the outside ring wheel 113 of the planetary wheel is also operated independently, wherein both of them can be operated individually or together to provide rotational kinetic energy output or differential driving output, whereby the interactive relationships achieved through combining with the differential wheel train can be selected as required to match with the afore said electromechanical auxiliary interface, and the mechanical auxiliary interface, structure interface as well as the various combination arrangements between the inner layer cylindrical common magnetic pole 141, the outer layer ring shaped armature 143, or the outer layer cylindrical armature 142, or the outside ring wheel 113, or the planetary wheel 115 or the sun wheel 114 of the differential wheel train and the active power source P0 or the load, or the casing static structure can also be selected as required.

FIG. 39-1 is a schematic diagram of the embodying example illustrating that the embodying example of FIG. 39 is modified to let the middle layer common structure be a free rotor, wherein it is mainly comprised of the following:

The three-layered electromagnetic structure with common structures 100: The inner layer cylindrical common magnetic pole 141 and the two independent outer layer ring shaped armatures 142, 143 arranged in a row are appeared in a three-layered coaxial coupling structure, wherein the inner layer cylindrical common magnetic pole 141 is operated independently through the electromagnetic effect with the two cylindrical armatures, and it is through the planetary wheel 115 to steer the swing arm 116 to drive the input/output shaft 117, and the outer layer ring shaped armature 142 is coupled with the sun wheel 114, while the outer layer ring shaped armature 143 is coupled with the outside ring wheel 113, whereby the interactive relationships achieved through combining with the differential wheel train can be selected as required to match with the afore said electromechanical auxiliary interface, and the mechanical auxiliary interface, structure interface as well as the various combination arrangements between the inner layer cylindrical common magnetic pole 141, the outer layer ring shaped armature 143, or the outer layer cylindrical armature 142, or the outside ring wheel 113, or the planetary wheel 115 or the sun wheel 114 of the differential wheel train and the active power source P0 or the load, or the casing static structure can also be selected as required.

Figure 40:
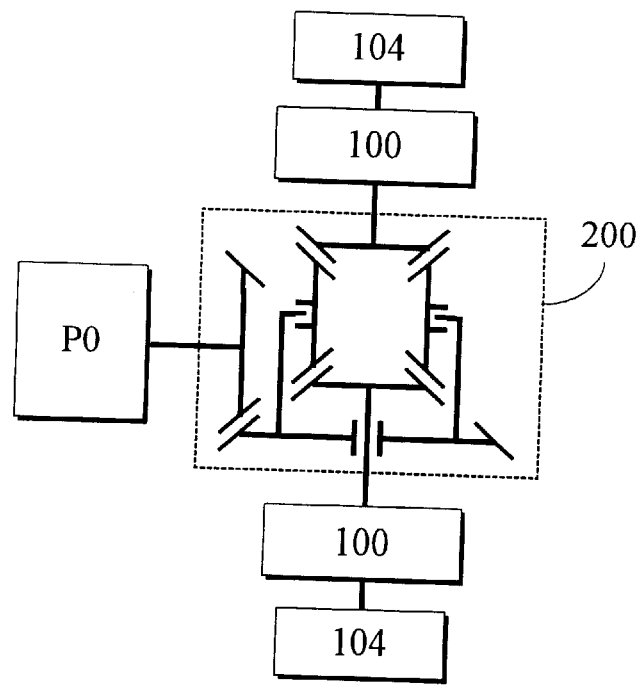
FIG. 40 is a schematic diagram of the embodying exam of the invention illustrating that the active power source is respectively coupled with the three-layered electromechanical structure through the two output shafts of the main differential wheel train to drive the load.

The combined power driven device having a three-layered electromechanical structure with common structures can be further installed with a main differential wheel train or multi-axis interactive staged wheel trains to drive the two (or more than two) electromagnetic interactive devices, i.e. at least one three-layered electromagnetic structure with common structures shall be driven by at least one active power source P0;

FIG. 40 is a schematic diagram of the embodying example of the invention illustrating that the active power source is respectively coupled with the three-layered electromechanical structure through the two output shafts of the main differential wheel train to drive the load, wherein it is mainly comprised of that a main differential wheel train 200 is further installed between the active power source P0 and two three-layered electromechanical structures 100 to let the active power source P0 drive the two output shafts of the three-layered electromagnetic structures through the main differential wheel train 200 to individually drive the loads 104, thereof besides of possessing their own electromechanical differential operations at different speeds, the two three-layered electromechanical structure 100 also possess the mechanical differential functions, and the other functions of the two three-layered electromechanical structure 100 are the same as when they are operated individually.

Figure 41:
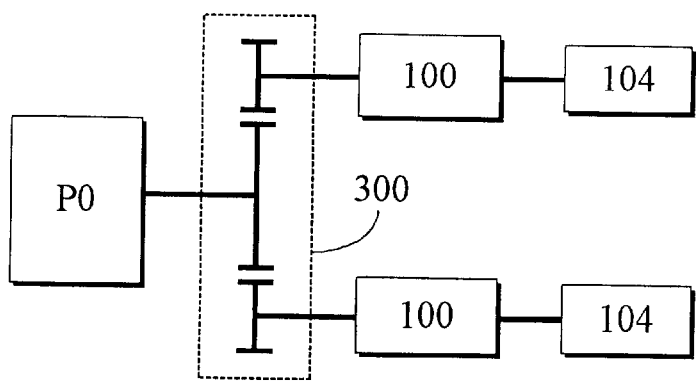
FIG. 41 is a schematic diagram of the embodying example of the invention illustrating that the active power source is respectively coupled with the three-layered electromechanical structures through the output shafts of the multi-axis interactive wheel train.

FIG. 41 is a schematic diagram of the embodying example of the invention illustrating that the active power source is respectively coupled with the three-layered electromechanical structures through the output shafts of the multi-axis interactive wheel train, wherein it is mainly comprised of that the multi-axis interactive wheel train 300 is further installed between the active power source P0 and the two three-layered electromechanical structures 100 to drive the individual load 104, wherein each three-layered electromechanical structure has electromechanical differential operating functions at different speeds as well as the various functions when they are operated individually.

In the embodying examples of the afore said FIGS. 40 and 41. One of the outer layer armature or the middle layer common magnetic pole or the inner layer armature of the three-layered electromagnetic structure with common structures are locking fixed or all of them are at drivable status, each the three-layered electromagnetic structure with common structures can be further combined with the differential wheel train (including the wheel train or gear train) which is comprised of the outside ring wheel, the planetary wheel and the output shaft driven by the swing arm steered by the said planetary wheel as well as the sun wheel, wherein the operation of each three-layered electromechanical structure and when it is combined with the differential wheel train are the same as the operations of a single structure except that the multiple units can be either operated individually or differentially driven with proportional interactions or synchronization, hereof these controls are normal arts which are not further delineated.

Based on the innovative art of the combined power driven device having a three-layered electromechanical structure with common structures of the application and the combination principles of the above said D1~D3 to have the diversity in installing the three-layered electromechanical structure and the matching types of them combined with the differential wheel trains, several application types of the three-layered electromechanical structures and the application examples of them combined with the differential wheel trains are listed in the following:

At least one active power source P0 is coupled with at least one three-layered electromagnetic structure with common structures directly or through transmission components, wherein the two input/output sides of the three-layered electromagnetic structure with common structures are installed with differential wheel trains based on the afore said coupling principles;

At least one active power source P0 is coupled with at least one three-layered electromagnetic structure with common structures directly or through transmission components, wherein the three-layered electromagnetic structure with common structures is comprised of two inner layer armatures 102A, 102B operated individually or commonly controlled by a clutch or an electrical circuit, and the middle layer common magnetic pole 101 coupled with the two independent inner layer armatures 102A, 102B and the outer layer armature 103 coupled at the other side of the middle layer common magnetic pole 101, and both sides of the said structure are installed with differential wheel trains based on the afore said combination principles;

At least one active power source P0 is coupled with at least one three-layered electromagnetic structure with common structures directly or through transmission components, wherein the three-layered electromagnetic structure with common structures is comprised of two outer layer armatures 103A, 103B operated individually or commonly controlled by a clutch or an electrical circuit, and the middle layer common magnetic pole 101 coupled with the two independent outer layer armatures 103A, 103B and the inner layer armature 102 coupled at the other side of the middle layer common magnetic pole 101, and both sides of the said structure are installed with differential wheel trains based on the afore said combination principles;

At least one active power source P0 is coupled with at least one three-layered electromagnetic structure with common structures directly or through transmission components, wherein the three-layered electromagnetic structure with common structures is comprised of two outer layer armatures 103A, 103B operated individually or commonly controlled by a clutch or an electrical circuit, two middle layer common magnetic poles 101A, 101B which are side coupled with the two outer layer armatures, and can be operated individually or commonly controlled by a clutch or an electrical circuit, and a inner layer armature 102 coupled inside with the middle layer common magnetic poles, and both sides of the said structure are installed with differential wheel trains based on the afore said combination principles;

At least one active power source P0 is coupled with at least one three-layered electromagnetic structure with common structures directly or through transmission components, wherein the three-layered electromagnetic structure with common structures is comprised of a common outer layer armature 103, two middle layer common magnetic poles 101A, 101B operated individually or commonly controlled by a clutch or an electrical circuit, and a inner layer armature 102 coupled with the common magnetic poles, wherein both sides of the said structure are installed with differential wheel trains based on the afore said combination principles;

At least one active power source P0 is coupled with at least one three-layered electromagnetic structure with common structures directly or through transmission components, wherein the three-layered electromagnetic structure with common structures is comprised of a common outer layer armature 103, two middle layer common magnetic poles 101A, 101B operated individually or commonly controlled by a clutch or an electrical circuit, and two inner layer armatures 102A, 102B which are coupled with the common magnetic poles and can be operated individually or commonly controlled by a clutch or an electrical circuit, wherein both sides of the said structure are installed with differential wheel trains based on the afore said combination principles;

At least one active power source P0 is coupled with at least one three-layered electromagnetic structure with common structures directly or through transmission components, wherein the three-layered electromagnetic structure with common structures is comprised of two outer layer armatures 103A, 103B operated individually or commonly controlled by a clutch or an electrical circuit, a middle layer common magnetic pole and two inner layer armatures 102A, 102B which are coupled with the common magnetic pole and can be operated individually or commonly controlled by a clutch or an electrical circuit, wherein both sides of the said structure are installed with differential wheel trains based on the afore said combination principles;

At least one active power source P0 is coupled with at least one three-layered electromagnetic structure with common structures directly or through transmission components, wherein both sides of the three-layered electromechanical structure with common structures are installed with differential wheel trains based on the afore said combination principles;

As summarized from the above descriptions, the innovative design of the combined power driven device having a three-layered electromechanical structure with common structures discloses an original three-layered electromagnetic common structure which can cut down the cost effectively and reduce the weight and space requirements, and is provided with the following characteristics:

1) For the disclosed three-layered electromagnetic structure with common structures embodied for generator and motor functions, both sides of the common magnetic pole are respectively installed with one or more than one armatures to couple with the magnetic pole, and the armatures can be operated independently or commonly driven or interactively controlled through their electromechanical characteristics;

2) The embodying types of the three-layered electromagnetic structure include two independently operated armatures, whereof they can be the motors or generators or the electrical machine with both of functions constituted by the AC or DC, brush or brushless, synchronized or synchronized types of the same or different electromechanical actuation types;

3) the three-layered electromagnetic structure with common structures as in 1), wherein the layer structures of the three-layered electromagnetic structure are respectively coupled with the sun wheel, outside ring wheel, the swing arm steered by the planetary wheel, or the differential wheel with fixed center of axis of the planetary type differential wheel train, the load, the external power source and the casing static structure for corresponding coupling combination selections based on the operating function requirements to constitute the required power units, whereby the loading side negative torque can be proportionally distributed between the active power source and the acting electromagnetic force source of the electromagnetic device rotors according to the speed ratio of the differential wheel train;

4) The unidirectional transmission device, or the limit components such as clutches or brakes can be installed between the respective corresponding rotors, or between the active power source P0 rotation shaft and the rotors of its coupled electrical machine, or between the acting power source P0 and the casing static structure to meet with the function requirements;

5) For the disclosed three-layered electromechanical structure with a common structure, the common magnetic pole of the common structure constituted by magnetic conductors and its coupled individually independent coaxial armature structures can also be exchangeable type, i.e. to have a common armature and its coupled individually independent field, or to have a common structure comprised of the independent magnetic poles and the armature and the said structure is respectively coaxially coupled with the individually independent fields and to have the same electromagnetic effects of the corresponding generator or motor functions.

6) The above sections has described the essence of the originality and usefulness of the application for that the applicant has surveyed relevant documents and has found no similar disclosure of prior arts related to the innovative three-layered electromagnetic structure with common structures, thereby your legal approval on the application is greatly appreciated.

What is claimed is:

1. A combined power driven device made up of three layers including an inner layer, a middle layer, and an outer layer, each of said three layers forming an electromechanical structure selected from the group consisting of a stator and an armature, said three layers sharing a common axis, wherein said middle layer serves as a common magnetic structure for interaction with the electromechanical structures formed by the other two layers, wherein a first one of the other two layers comprises an input rotor coupled to an active power source and is arranged to selectively serve, together with the middle layer and independently of a second one of the other two layers, as both a DC motor and a DC generator such that:
  (i) when said middle layer is rotated by the second one of the other two layers or by an external power source, said input rotor and middle layer interact to form a generator, and
  (ii) when said input rotor and said middle layer are operated to serve as a motor, said input rotor drives the middle layer to rotate, and wherein said second one of the other two layers, together with the middle layer and independently of the first one of the other two layers, is arranged to selectively serve as a DC or AC motor and a DC or AC generator, and further comprising a unidirectional transmission device coupled between at least two of said layers.

2. A combined power driven device as claimed in claim 1, wherein said inner and outer layers are two independent armatures.

3. A combined power driven device as claimed in claim 2, wherein said common magnetic structure includes a common magnetic pole for said two independent armatures.

4. A combined power driven device as claimed in claim 2, wherein said common magnetic structure includes a separate respective magnetic pole for each of said two independent armatures.

5. A combined power driven device as claimed in claim 1, wherein a first of said three layers is fixed with respect to a casing static structure, a second of said three layers is coupled to a load, and a third of said three layers is coupled with an active power source.

6. A combined power driven device as claimed in claim 5, wherein said third layer is driven by the active power source to generate electricity in a winding on said first layer, said electricity in said winding causing said second layer to rotate and drive said load.

7. A combined power driven device as claimed in claim 5, wherein said third layer is driven by the active power source to generate electricity, said electricity being supplied to a battery, said battery supplying electricity back to a winding on said first layer, said electricity in said winding causing said second layer to rotate and drive said load.

8. A combined power driven device as claimed in claim 1, wherein said three layers include three interactive armatures, said three interactive armatures forming a closed magnetic circuit.

9. A combined power driven device as claimed in claim 1, wherein the electromechanical structures of said three layers each has a shape selected from the group consisting of a cylinder, ring, cone, disk, and cup shape.

10. A combined power driven device as claimed in claim 1, wherein said electromechanical structures of said three layers are coupled to provide additive torque for driving a load.

11. A combined power driven device as claimed in claim 1, wherein said electromechanical structures of said three layers are coupled to provide additive speeds for driving a load.

12. A combined power driven device as claimed in claim 1, wherein one of the electromechanical structures of said three layer is coupled to an active power source, and said active power source is an engine.

13. A combined power driven device made up of three layers including an inner layer, a middle layer, and an outer layer, each of said three layers forming an electromechanical structure selected from the group consisting of a stator and an armature, said three layers sharing a common axis,
  wherein said middle layer serves as a common magnetic structure for interaction with the electromechanical structures formed by the other two layers,
  wherein a first one of the other two layers comprises an input rotor coupled to an active power source and is arranged to selectively serve, together with the middle layer and independently of a second one of the other two layers, as both a DC motor and a DC generator such that:
    (iii) when said middle layer is rotated by the second one of the other two layers or by an external power source, said input rotor and middle layer interact to form a generator, and
    (iv) when said input rotor and said middle layer are operated to serve as a motor, said input rotor drives the middle layer to rotate, and
  wherein said second one of the other two layers, together with the middle layer and independently of the first one of the other two layers, is arranged to selectively serve as a DC or AC motor and a DC or AC generator, and
  further comprising a clutch coupled between at least two of said layers.

14. A combined power driven device made up of three layers including an inner layer, a middle layer, and an outer layer, each of said three layers forming an electromechanical structure selected from the group consisting of a stator and an armature, said three layers sharing a common axis,
  wherein said middle layer serves as a common magnetic structure for interaction with the electromechanical structures formed by the other two layers,
  wherein a first one of the other two layers comprises an input rotor coupled to an active power source and is arranged to selectively serve. together with the middle layer and independently of a second one of the other two layers, as both a DC motor and a DC generator such that:
    (v) when said middle layer is rotated by the second one of the other two layers or by an external power source, said input rotor and middle layer interact to form a generator, and
    (vi) when said input rotor and said middle layer are operated to serve as a motor, said input rotor drives the middle layer to rotate, and
  wherein said second one of the other two layers, together with the middle layer and independently of the first one of the other two layers, is arranged to selectively serve as a DC or AC motor and a DC or AC generator, and
  further comprising a differential wheel train coupled between at least two of said layers.

* * * * *